United States Patent
Ying et al.

(10) Patent No.: US 11,943,835 B2
(45) Date of Patent: Mar. 26, 2024

(54) COMMUNICATION METHOD AND COMMUNICATIONS APPARATUS FOR PC5 V2X

(71) Applicant: HUAWEI TECHNOLOGIES CO., LTD., Guangdong (CN)

(72) Inventors: Jiangwei Ying, Beijing (CN); Meng Li, Beijing (CN); Xiao Xiao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 78 days.

(21) Appl. No.: 17/549,694

(22) Filed: Dec. 13, 2021

(65) Prior Publication Data

US 2022/0109971 A1 Apr. 7, 2022

Related U.S. Application Data

(63) Continuation of application No. PCT/CN2020/095892, filed on Jun. 12, 2020.

(30) Foreign Application Priority Data

Jun. 12, 2019 (CN) .......................... 201910507653.1

(51) Int. Cl.
*H04W 8/04* (2009.01)
*H04W 8/12* (2009.01)
(Continued)

(52) U.S. Cl.
CPC ............... *H04W 8/04* (2013.01); *H04W 8/12* (2013.01); *H04W 28/0268* (2013.01); *H04W 92/18* (2013.01)

(58) Field of Classification Search
CPC ..... H04W 8/04; H04W 8/12; H04W 28/0268; H04W 92/18; H04W 4/44; H04W 28/02;
(Continued)

(56) References Cited

U.S. PATENT DOCUMENTS

2006/0294363 A1* 12/2006 Bae ..................... H04L 63/0892
713/153
2014/0024383 A1* 1/2014 Rahman ............ H04W 28/0268
455/445
(Continued)

FOREIGN PATENT DOCUMENTS

CN 107710795 A 2/2018
CN 107771398 A 3/2018
(Continued)

OTHER PUBLICATIONS

Qualcomm Incorporated, QoS and priority handling for PC5 based V2X communication. SA WG2 Meeting #115, May 23-27, 2016, Nanjing, P.R. China, S2-162859, 5 pages.
(Continued)

*Primary Examiner* — Afshawn M Towfighi
(74) *Attorney, Agent, or Firm* — Gregg Jansen

(57) ABSTRACT

Embodiments of this application disclose a communication method and a communications apparatus, and are used in the field of communications technologies, to resolve a problem of how to notify an access network device of an NR PC5 QoS parameter of a terminal. The method in one embodiment includes a home V2XCF that obtains an NR PC5 QoS parameter of a terminal, and the home V2XCF sends the NR PC5 QoS parameter to an access network device, such as a first network element that is in an EPS. The first network element receives the NR PC5 QoS parameter and sends the NR PC5 QoS parameter to an MME. After receiving the NR PC5 QoS parameter, the MME sends the NR PC5 QoS parameter to an access network device. The first network element may be an HSS or a PCRF.

19 Claims, 14 Drawing Sheets

(51) Int. Cl.
*H04W 28/02* (2009.01)
*H04W 92/18* (2009.01)

(58) Field of Classification Search
CPC ......... H04W 8/20; H04W 60/04; H04W 4/40; H04W 76/10
See application file for complete search history.

(56) References Cited

U.S. PATENT DOCUMENTS

| | | | |
|---|---|---|---|
| 2014/0177530 A1* | 6/2014 | Zhao | H04W 12/08 370/328 |
| 2017/0367098 A1 | 12/2017 | Byun et al. | |
| 2018/0014178 A1 | 1/2018 | Baek et al. | |
| 2018/0183855 A1 | 6/2018 | Sabella et al. | |
| 2018/0234524 A1 | 8/2018 | Cheng et al. | |
| 2019/0037448 A1 | 1/2019 | Shan et al. | |
| 2019/0124015 A1* | 4/2019 | Loehr | G06F 21/43 |
| 2019/0149365 A1 | 5/2019 | Chatterjee et al. | |
| 2019/0289459 A1* | 9/2019 | Shan | H04W 76/25 |
| 2019/0313359 A1* | 10/2019 | Lee | H04W 4/40 |
| 2020/0178123 A1* | 6/2020 | Shan | H04W 36/0016 |
| 2022/0095260 A1* | 3/2022 | Shan | H04W 60/04 |
| 2022/0295337 A1* | 9/2022 | Kim | H04W 76/14 |

FOREIGN PATENT DOCUMENTS

| | | |
|---|---|---|
| CN | 108307472 A | 7/2018 |
| CN | 108702722 A | 10/2018 |
| EP | 3244677 A1 | 11/2017 |
| WO | 2018044144 A1 | 3/2018 |
| WO | 2018093220 A1 | 5/2018 |
| WO | 2018117774 A1 | 6/2018 |
| WO | 2018182603 A1 | 10/2018 |

OTHER PUBLICATIONS

Husain Syed et al: "The Road to 5G V2X: Ultra-High Reliable Communications", 2018 IEEE Conference on Standards for Communications and Networking (CSCN), IEEE, Oct. 29, 2018, pp. 1-6, XP033480441.

Zhu Hongmei et al., Research on Standard, Key Technology and Network Architecture for Cellular Vehicular Networks. Mobile Communications, 2018, 5 pages.

Huawei et al., "NR SL QoS parameters provision in E-UTRAN node connecting to the EPC", 3GPP TSG-SA WG2 Meeting #134 S2-1907628, Jun. 28, 2019,total 2 pages.

3GPP TR 23.786 V16.1.0:"3rd Generation Partnership Project;Technical Specification Group Services and System Aspects;Study on architecture enhancements for theEvolved Packet System (EPS) and the 5G System (5GS)to support advanced V2X services(Release 16)",Jun. 2019, total 119 pages.

3GPP TS 23.285 V15.0.0 (Mar. 2018), 3rd Generation Partnership Project; Technical Specification Group Services and System Aspects; Architecture enhancements for V2X services(Release 15), 36 pages.

3GPP TS 23.287 V1.0.0 (May 2019)3rd Generation Partnership Project;Technical Specification Group Services and System Aspects;Architecture enhancements for 5G System (5GS) to support Vehicle-to-Everything (V2X) services (Release 16),total 47 pages.

3GPP TR 23.786 V0. 10.0 (Dec. 2018), 3rd Generation Partnership Project; Technical Specification Group Services and System Aspects; Study on architecture enhancements for EPS and 5G System to support advanced V2X services (Release 16), 109 pages.

3GPP TS 23.285 V16.0.0 (Mar. 2019), 3rd Generation Partnership Project; Technical Specification Group Services and System Aspects; Architecture enhancements for V2X services(Release 16), 37 pages.

Huawei, HiSilicon, Solution to Key Issue #4: Network-controlled QoS mechanism for side link communication. SA WG2 Meeting #127bis, Newport Beach, CA, USA, May 28-Jun. 1, 2018, S2-185852, 5 pages.

* cited by examiner

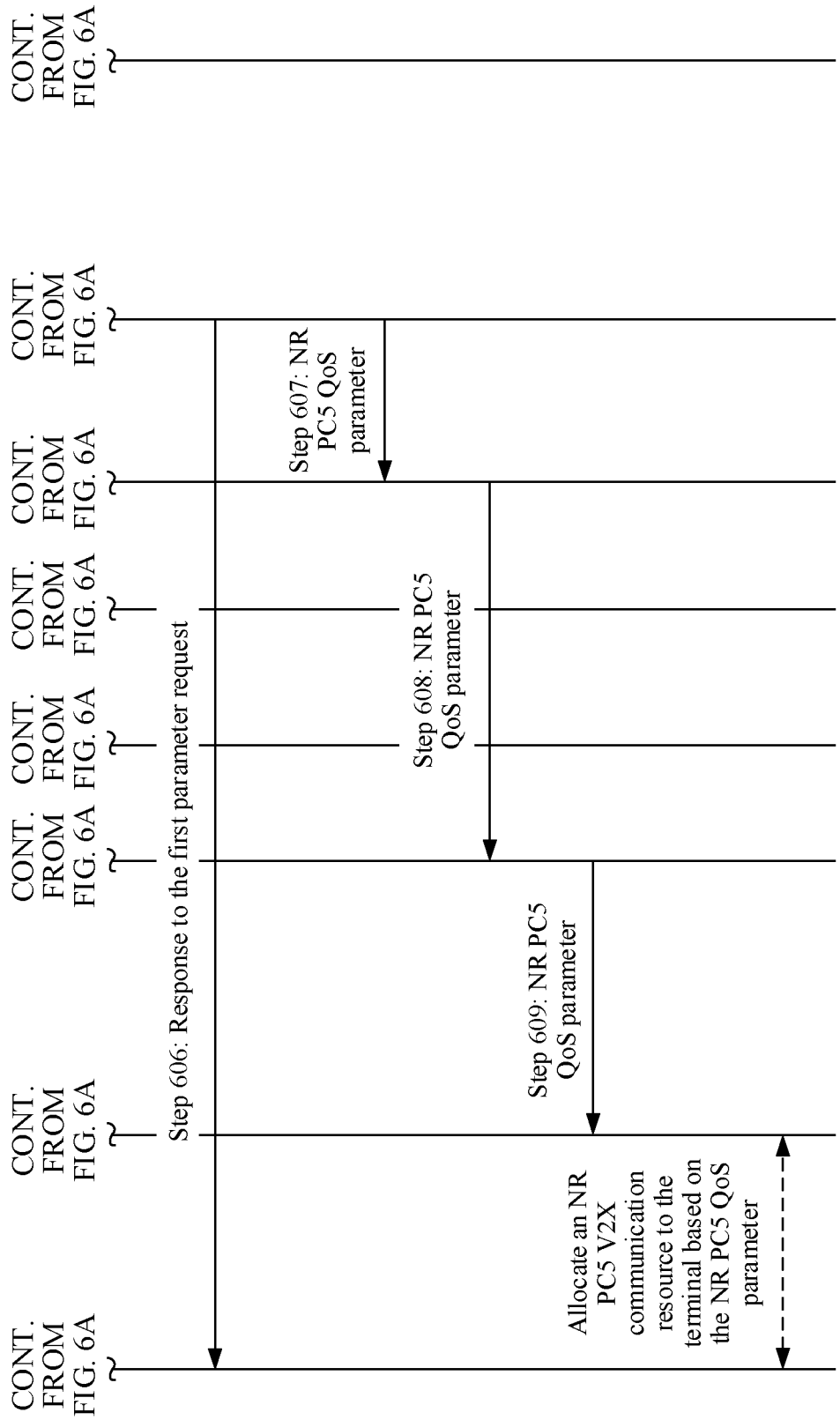

COMMUNICATION METHOD AND COMMUNICATIONS APPARATUS FOR PC5 V2X

CROSS-REFERENCE TO RELATED APPLICATION

This application is a continuation of International Application No. PCT/CN2020/095892, filed on Jun. 12, 2020, which claims priority to Chinese Patent Application No. 201910507653.1, filed on Jun. 12, 2019. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

In a 4th generation network, PC5 vehicle to everything (V2X) communication may be performed between terminals. To improve a coverage area of the PC5 V2X communication and reduce costs caused by deployment of an access network device (for example, a base station) that supports a new radio (NR) technology, an operator considers upgrading the 4G network to implement NR PC5 V2X communication, for example, introducing an NR PC5 V2X technology to the 4G network, so that the NR PC5 V2X communication can be performed between the terminals by using the NR PC5 V2X technology.

Before the terminal performs the NR PC5 V2X communication, the access network device needs to allocate a communication resource to the terminal based on an NR PC5 quality of service (QoS) parameter of the terminal, and the terminal performs the NR PC5 V2X communication on the communication resource allocated by the access network device. However, the conventional technology does not specify how to notify the access network device of the NR PC5 QoS parameter of the terminal, so that the access network device allocates the communication resource for the NR PC5 V2X communication of the terminal based on the NR PC5 QoS parameter of the terminal.

SUMMARY

Embodiments of this application provide a communication method and a communications apparatus, to resolve a problem of how to notify an access network device of an NR PC5 QoS parameter of a terminal.

To achieve the foregoing objective, the following technical solutions are used in the embodiments of this application.

According to a first aspect, an embodiment of this application provides a communication method. The method may include: An MME obtains an NR PC5 QoS parameter that is of a terminal and that is used for NR PC5 V2X communication of the terminal, and sends the NR PC5 QoS parameter to an access network device.

According to the method described in the first aspect, the MME obtains the NR PC5 QoS parameter of the terminal, and sends the obtained NR PC5 QoS parameter to the access network device, so that the access network device allocates, based on the NR PC5 QoS parameter, a communication resource for the terminal to perform the NR PC5 V2X communication. In this way, a feasible solution of notifying the access network device of the NR PC5 QoS parameter is provided.

In an embodiment, with reference to the first aspect, that the MME obtains the new radio PC5 quality of service NR PC5 QoS parameter of the terminal includes: The MME obtains the NR PC5 QoS parameter from an HSS. Based on the embodiment, the MME may obtain the NR PC5 QoS parameter of the terminal from the HSS; in other words, the HSS notifies the MME of the NR PC5 QoS parameter, and then the MME notifies the access network device of the NR PC5 QoS parameter. This is simple and easy to implement.

In an embodiment, with reference to the embodiments of the first aspect, that the MME obtains the NR PC5 QoS parameter from an HSS includes: The MME receives, from the HSS, subscription data that is of the terminal and that includes the NR PC5 QoS parameter. Based on the embodiment, the NR PC5 QoS parameter may be carried in the subscription data of the terminal, and the NR PC5 QoS parameter of the terminal is sent to the access network device by using an existing subscription data delivery procedure, so that signaling overheads are reduced, and a communication procedure in an existing communications network is compatible.

In an embodiment, with reference to the first aspect, that the MME obtains the NR PC5 QoS parameter from an HSS further includes: The MME receives a registration request from the terminal and that is used to request to register the terminal with a network, and requests the subscription data of the terminal from the HSS based on the registration request. Based on the embodiment, the MME may actively request the subscription data of the terminal from the HSS by using an existing registration procedure, so that functions of network elements in an original communications system are maintained, signaling overheads are reduced, and compatibility is relatively good.

In an embodiment, with reference to the first aspect or the embodiments of the first aspect, that the MME obtains the NR PC5 QoS parameter from an HSS includes: The MME receives a subscription data update message from the HSS and that carries the NR PC5 QoS parameter of the terminal; or the MME receives a subscription data update message from the HSS and that carries subscription data of the terminal, where the subscription data of the terminal includes the NR PC5 QoS parameter. Based on the embodiment, when the NR PC5 QoS parameter of the terminal is updated, the HSS may directly send the subscription data update message including the updated NR PC5 QoS parameter to the MME; or the HSS may carry the updated NR PC5 QoS parameter in the subscription data of the terminal, and send, to the MME, the subscription data together with other subscription information of other terminals. This is simple and easy to implement, and sending manners are flexible and diverse.

In an embodiment, with reference to the first aspect, that the MME obtains the NR PC5 QoS parameter of the terminal includes: The MME obtains the NR PC5 QoS parameter from a PCRF. Based on the embodiment, the MME may obtain the NR PC5 QoS parameter of the terminal from the PCRF; in other words, the PCRF notifies the MME of the NR PC5 QoS parameter, and then the MME notifies the access network device of the NR PC5 QoS parameter. This is simple and easy to implement.

In an embodiment, with reference to the embodiment of the first aspect, that the MME obtains the NR PC5 QoS parameter from a PCRF includes: The MME sends, to an SGW based on a registration request that is from the terminal and that is used to request to register the terminal with a network, a session setup request used to request to establish a PDN connection for the terminal. The SGW receives the session setup request, and sends the session setup request to a PGW. The PGW receives the session setup request, and sends, to the PCRF, an IP connectivity access network setup request used to request a PCC rule of the terminal. The PCRF receives the IP connectivity access network setup request, and sends an IP connectivity access network setup response including the PCC rule of the terminal to the PGW. The PCC rule of the terminal includes the NR PC5 QoS parameter. The PGW receives the IP connectivity access network setup response, and sends a session setup response including a bearer context of the PDN connection of the terminal to the SGW. The bearer context includes the NR PC5 QoS parameter. The SGW receives the session setup response, and sends the session setup response to the MME. The MME receives the session setup response, and obtains the NR PC5 QoS parameter from the bearer context of the PDN connection of the terminal.

Based on the embodiment, the NR PC5 QoS parameter of the terminal may be carried in the PCC rule of the terminal, the PCC rule that carries the NR PC5 QoS parameter is sent to the PGW by using an existing PDN connection setup procedure, and the PGW sends the NR PC5 QoS parameter to the MME through the SGW, so that the MME sends the NR PC5 QoS parameter to the access network device. In this way, the NR PC5 QoS parameter of the terminal is sent to the access network device by using the existing PDN connection setup procedure, so that signaling overheads are reduced, and the procedure is compatible with a communication procedure in an existing communications network.

In an embodiment, with reference to the embodiments of the first aspect, that the MME obtains the NR PC5 QoS parameter from a PCRF includes: The PCRF sends an IP connectivity access network modification request including the NR PC5 QoS parameter to a PGW; The PGW receives the IP connectivity access network modification request, and sends a session modification request including the NR PC5 QoS parameter to an SGW. The SGW receives the session modification request, and sends the session modification request to the MME. The MME obtains the NR PC5 QoS parameter from the session modification request. Based on the embodiment, when the NR PC5 QoS parameter of the terminal is updated, the PCRF may send the IP connectivity access network modification request including the updated NR PC5 QoS parameter to the PGW. This is simple and easy to implement.

In an embodiment, with reference to any one of the first aspect or the embodiments of the first aspect, the method further includes: The MME stores the NR PC5 QoS parameter, for example, stores the NR PC5 QoS parameter in the context of the terminal.

Based on the embodiment, the MME may locally store the NR PC5 QoS parameter. Subsequently, after receiving the registration request of the terminal, the MME may obtain, based on the identifier of the terminal, the NR PC5 QoS parameter from data currently stored by the MME, and send the NR PC5 QoS parameter to the access network device. The MME does not need to interact with the HSS or the PCRF to obtain the NR PC5 QoS parameter. This is simple and easy to implement, and reduces signaling overheads.

According to a second aspect, this application provides a communications apparatus. The communications apparatus may be an MME, a chip in an MME, or a system on chip. The communications apparatus may implement functions performed by the MME in the foregoing aspects or embodiments. The functions may be implemented by hardware, or may be implemented by hardware by executing corresponding software. The hardware or the software includes one or more modules corresponding to the foregoing functions. For example, the communications apparatus may include an obtaining unit and a sending unit.

The obtaining unit is configured to obtain an NR PC5 QoS parameter that is of a terminal and that is used for NR PC5 V2X communication of the terminal.

The sending unit is configured to send the NR PC5 QoS parameter to an access network device.

For an implementation of the communications apparatus, refer to behavior functions of the MME in the communication method provided in any one of the first aspect or the embodiments of the first aspect. Any one of the first aspect or the embodiments of the first aspect may be correspondingly implemented by the obtaining unit and the sending unit that are included in the communications apparatus. This is described in the following embodiments.

In an embodiment, with reference to the second aspect, the obtaining unit is configured to obtain the NR PC5 QoS parameter from an HSS. Based on the embodiment, the communications apparatus may obtain the NR PC5 QoS parameter of the terminal from the HSS; in other words, the HSS notifies the communications apparatus of the NR PC5 QoS parameter, and then the communications apparatus notifies the access network device of the NR PC5 QoS parameter. This is simple and easy to implement.

In an embodiment, with reference to the embodiments of the second aspect, the obtaining unit is configured to receive, from the HSS, subscription data that is of the terminal and that includes the NR PC5 QoS parameter. Based on the embodiment, the NR PC5 QoS parameter may be carried in the subscription data of the terminal, and the NR PC5 QoS parameter of the terminal is sent to the access network device by using an existing subscription data delivery procedure, so that signaling overheads are reduced, and a communication procedure in an existing communications network is compatible.

In an embodiment, with reference to the second aspect or the embodiment of the second aspect, the obtaining unit is configured to: receive a registration request that is from the terminal and that is used to request to register the terminal with a network, and request the subscription data of the terminal from the HSS based on the registration request. Based on the embodiment, the communications apparatus may actively request the subscription data of the terminal from the HSS by using an existing registration procedure, so that functions of network elements in an original communications system are maintained, signaling overheads are reduced, and compatibility is relatively good.

In an embodiment, with reference to the second aspect or the embodiments of the second aspect, the obtaining unit is configured to: receive a subscription data update message that is from the HSS and that carries the NR PC5 QoS parameter of the terminal, or receive a subscription data update message that is from the HSS and that carries subscription data of the terminal, where the subscription data of the terminal includes the NR PC5 QoS parameter. Based on the embodiment, when the NR PC5 QoS parameter of the terminal is updated, the HSS may directly send the subscription data update message including the updated NR PC5 QoS parameter to the communications apparatus; or the HSS may carry the updated NR PC5 QoS parameter in the subscription data of the terminal, and send, to the communications apparatus, the subscription data together with other subscription information of other terminals. This is simple and easy to implement, and sending manners are flexible and diverse.

In an embodiment, with reference to the second aspect, the obtaining unit is configured to obtain the NR PC5 QoS parameter from a PCRF. Based on the embodiment, the communications apparatus may obtain the NR PC5 QoS parameter of the terminal from the PCRF; in other words, the PCRF notifies the communications apparatus of the NR PC5 QoS parameter, and then the communications apparatus notifies the access network device of the NR PC5 QoS parameter. This is simple and easy to implement.

In an embodiment, with reference to the embodiments of the second aspect, the obtaining unit is configured to send, to an SGW based on a registration request that is of the terminal and that is used to request to register the terminal with a network, a session setup request used to request to establish a PDN connection for the terminal. The SGW receives the session setup request, and sends the session setup request to a PGW. The PGW receives the session setup request, and sends, to the PCRF, an IP connectivity access network setup request used to request a PCC rule of the terminal. The PCRF receives the IP connectivity access network setup request, and sends an IP connectivity access network setup response including the PCC rule of the terminal to the PGW. The PCC rule of the terminal includes the NR PC5 QoS parameter. The PGW receives the IP connectivity access network setup response, and sends a session setup response including a bearer context of the PDN connection of the terminal to the SGW. The bearer context includes the NR PC5 QoS parameter. The SGW receives the session setup response, and sends the session setup response to the obtaining unit. The obtaining unit receives the session setup response, and obtains the NR PC5 QoS parameter from the bearer context of the PDN connection of the terminal.

Based on the embodiment, the NR PC5 QoS parameter of the terminal may be carried in the PCC rule of the terminal, the PCC rule that carries the NR PC5 QoS parameter is sent to the PGW by using an existing PDN connection setup procedure, and the PGW sends the NR PC5 QoS parameter to the communications apparatus through the SGW, so that the communications apparatus sends the NR PC5 QoS parameter to the access network device. In this way, the NR PC5 QoS parameter of the terminal is sent to the access network device by using the existing PDN connection setup procedure, so that signaling overheads are reduced, and the procedure is compatible with a communication procedure in an existing communications network.

In an embodiment, with reference to the embodiments of the second aspect, the PCRF sends an IP connectivity access network modification request including a PCC rule of the terminal to a PGW. The PCC rule of the terminal includes the NR PC5 QoS parameter. The PGW receives the IP connectivity access network modification request, and sends a session modification request including the NR PC5 QoS parameter to an SGW. The SGW receives the session modification request, and sends the session modification request to the obtaining unit of the communications apparatus. The obtaining unit obtains the session modification request.

Based on the embodiment, when the NR PC5 QoS parameter of the terminal is updated, the PCRF may send the IP connectivity access network modification request including the updated NR PC5 QoS parameter to the communications apparatus. This is simple and easy to implement.

In an embodiment, with reference to any one of the second aspect or the embodiments of the second aspect, the communications apparatus further includes a storage unit. The storage unit is configured to store the NR PC5 QoS parameter, for example, store the NR PC5 QoS parameter in the context of the terminal.

Based on the embodiment, the communications apparatus may locally store the NR PC5 QoS parameter. Subsequently, after receiving the registration request of the terminal, the communications apparatus may obtain, based on the identifier of the terminal, the NR PC5 QoS parameter from data currently stored by the communications apparatus, and send the NR PC5 QoS parameter to the access network device. The communications apparatus does not need to interact with the HSS or the PCRF to obtain the NR PC5 QoS parameter. This is simple and easy to implement and reduces signaling overheads.

According to a third aspect, a communications apparatus is provided, including a processor and a memory. The memory is configured to store a computer executable instruction. When the communications apparatus runs, the processor executes the computer executable instruction stored in the memory, so that the communications apparatus performs the communication method according to any one of the first aspect or the embodiments of the first aspect.

According to a fourth aspect, a computer-readable storage medium is provided. The computer-readable storage medium stores an instruction. When the instruction is run on a computer, the computer is enabled to perform the communication method according to any one of the first aspect or the embodiments of the foregoing aspects.

According to a fifth aspect, a computer program product including an instruction is provided. When the computer program product runs on a computer, the computer is enabled to perform the communication method according to the first aspect or the embodiments of the foregoing aspects.

According to a sixth aspect, a chip system is provided. The chip system includes a processor and a communications interface, and is configured to support a communications apparatus in implementing functions in the foregoing aspects. For example, the processor obtains, through the communications interface, an NR PC5 QoS parameter that is of a terminal and that is used for NR PC5 V2X communication of the terminal, and sends the NR PC5 QoS parameter to an access network device through the communications interface. In an embodiment, the chip system further includes a memory. The memory is configured to store a program instruction and data that are necessary for the communications apparatus. The chip system may include a chip, or may include a chip and another discrete device.

For a technical effect brought by any design manner in the third aspect to the sixth aspect, refer to the technical effect brought by any one of the first aspect or the embodiments of the first aspect. Details are not described again.

According to a seventh aspect, an embodiment of this application provides another communication method. The method may include: An HSS obtains, from a home V2XCF, an NR PC5 QoS parameter that is of a terminal and that is used for NR PC5 V2X communication of the terminal. The HSS sends the NR PC5 QoS parameter to an MME.

According to the method described in the seventh aspect, the HSS obtains the NR PC5 QoS parameter of the terminal from the home V2XCF, and sends the obtained NR PC5 QoS parameter to an access network device through the MME, so that the access network device allocates, based on the NR PC5 QoS parameter, a communication resource for the terminal to perform the NR PC5 V2X communication. In this way, a feasible solution of notifying the access network device of the NR PC5 QoS parameter is provided.

In an embodiment, with reference to the seventh aspect, that the HSS obtains the NR PC5 QoS parameter of the terminal from the home V2XCF includes: The HSS receives a first request that is from the MME and that is used to request subscription data of the terminal, and sends, to the home V2XCF based on the first request, a second request used to request the NR PC5 QoS parameter. The HSS receives, from the home V2XCF, a response that is to the second request and that includes the NR PC5 QoS parameter. Based on the embodiment, the HSS may request the NR PC5 QoS parameter of the terminal from the home V2XCF at the request of the MME. This is simple and easy to implement.

In an embodiment, with reference to the seventh aspect, that the HSS sends the NR PC5 QoS parameter to an MME includes: The HSS sends, to the MME based on the response to the second request, the subscription data that is of the terminal and that includes the NR PC5 QoS parameter. Based on the embodiment, the HSS may send, to the MME, subscription data that is of the terminal and that includes the NR PC5 QoS parameter and other subscription data of the terminal. In other words, the NR PC5 QoS parameter is sent to the MME by using a subscription data delivery procedure, without adding a new information element to carry the NR PC5 QoS parameter, thereby reducing signaling overheads.

In an embodiment, with reference to any one of the seventh aspect or the embodiments of the seventh aspect, when the MME is a visited MME of the terminal, the second request includes information about a visited PLMN of the terminal. Based on the embodiment, when the terminal is roaming, the information about the visited network in which the terminal is located may be notified to the home V2XCF, so that the home V2XCF obtains, from a visited V2XCF based on the information about the visited network, a configuration parameter allowed to be used by the terminal in the visited network, and then determines the NR PC5 QoS parameter of the terminal based on the configuration parameter allowed to be used by the terminal in the visited network and a configuration parameter allowed to be used by the terminal in a home network, thereby reducing the ease of implementation.

In an embodiment, with reference to any one of the seventh aspect or the embodiments of the seventh aspect, that the HSS sends the NR PC5 QoS parameter to an MME includes: The HSS sends a subscription data update message to the MME, where the subscription data update message includes the NR PC5 QoS parameter; or the HSS sends a subscription data update message carrying subscription data of the terminal to the MME, where the subscription data of the terminal includes the NR PC5 QoS parameter.

Based on the embodiment, when the NR PC5 QoS parameter of the terminal is updated, the HSS may directly send the subscription data update message including the updated NR PC5 QoS parameter to the MME; or the HSS may carry the updated NR PC5 QoS parameter in the subscription data of the terminal, and send, to the MME, the subscription data together with other subscription information of other terminals. This is simple and easy to implement, and sending manners are flexible and diverse.

According to an eighth aspect, a communications apparatus is provided. The communications apparatus may be an HSS, a chip in an HSS, or a system on chip. The communications apparatus may implement functions performed by the HSS in the foregoing aspects or embodiments. The functions may be implemented by hardware, or may be implemented by hardware by executing corresponding software. The hardware or the software includes one or more modules corresponding to the foregoing functions. For example, the communications apparatus may include an obtaining unit and a sending unit.

The obtaining unit is configured to obtain, from a home V2XCF, an NR PC5 QoS parameter used for NR PC5 V2X communication of a terminal.

The sending unit is configured to send the NR PC5 QoS parameter to an MME.

For an implementation of the communications apparatus, refer to behavior functions of the HSS in the communication method provided in any one of the seventh aspect or the embodiments of the seventh aspect. Any one of the seventh aspect or the embodiments of the seventh aspect may be correspondingly implemented by the obtaining unit and the sending unit that are included in the communications apparatus. For details, refer to descriptions in the following design.

In an embodiment, with reference to the eighth aspect, the obtaining unit is configured to: receive a first request that is from the MME and that is used to request subscription data of the terminal, and send, to the home V2XCF based on the first request, a second request used to request the NR PC5 QoS parameter. The communications apparatus receives, from the home V2XCF, a response that is to the second request and that includes the NR PC5 QoS parameter. Based on the embodiment, the communications apparatus may request the NR PC5 QoS parameter of the terminal from the home V2XCF at the request of the MME. This is simple and easy to implement.

In an embodiment, with reference to the eighth aspect, the sending unit is configured to send, to the MME based on the response to the second request, the subscription data that is of the terminal and that includes the NR PC5 QoS parameter. Based on the embodiment, the communications apparatus may send, to the MME, subscription data that is of the terminal and that includes the NR PC5 QoS parameter and other subscription data of the terminal. In other words, the NR PC5 QoS parameter is sent to the MME by using a subscription data delivery procedure, without adding a new information element to carry the NR PC5 QoS parameter, thereby reducing signaling overheads.

In an embodiment, with reference to any one of the eighth aspect or the embodiments of the eighth aspect, when the MME is a visited MME of the terminal, the second request includes information about a visited PLMN of the terminal. Based on the embodiment, when the terminal is roaming, the information about the visited network in which the terminal is located may be notified to the home V2XCF, so that the home V2XCF obtains, from a visited V2XCF based on the information about the visited network, a configuration parameter allowed to be used by the terminal in the visited network, and then determines the NR PC5 QoS parameter of the terminal based on the configuration parameter allowed to be used by the terminal in the visited network and a configuration parameter allowed to be used by the terminal in a home network, thereby reducing the ease of implementation.

In an embodiment, with reference to any one of the eighth aspect or the embodiments of the eighth aspect, the sending unit is configured to: send a subscription data update message to the MME, where the subscription data update message includes the NR PC5 QoS parameter; or send a subscription data update message carrying subscription data of the terminal to the MME, where the subscription data of the terminal includes the NR PC5 QoS parameter.

Based on the embodiment, when the NR PC5 QoS parameter of the terminal is updated, the communications apparatus may directly send the subscription data update message including the updated NR PC5 QoS parameter to the MME; or the communications apparatus may carry the updated NR PC5 QoS parameter in the subscription data of the terminal, and send, to the MME, the subscription data together with other subscription information of other terminals. This is simple and easy to implement, and sending manners are flexible and diverse.

According to a ninth aspect, a communications apparatus is provided, including a processor and a memory. The memory is configured to store a computer executable instruction. When the communications apparatus runs, the processor executes the computer executable instruction stored in the memory, so that the communications apparatus performs the communication method according to any one of the seventh aspect or the embodiments of the seventh aspect.

According to a tenth aspect, a computer-readable storage medium is provided. The computer-readable storage medium stores an instruction. When the instruction is run on a computer, the computer is enabled to perform the communication method according to any one of the seventh aspect or the embodiments of the foregoing aspects.

According to an eleventh aspect, a computer program product including an instruction is provided. When the computer program product runs on a computer, the computer is enabled to perform the communication method according to any one of the seventh aspect or the embodiments of the foregoing aspects.

According to a twelfth aspect, a chip system is provided. The chip system includes a processor and a communications interface, and is configured to support a communications apparatus in implementing functions in the foregoing aspects. For example, the processor obtains, from a home V2XCF through the communications interface, an NR PC5 QoS parameter used for NR PC5 V2X communication of the terminal, and sends the NR PC5 QoS parameter to an MME through the communications interface. In an embodiment, the chip system further includes a memory. The memory is configured to store a program instruction and data that are necessary for the communications apparatus. The chip system may include a chip, or may include a chip and another discrete device.

For a technical effect brought by any design manner in the ninth aspect to the twelfth aspect, refer to the technical effect brought by any one of the seventh aspect or the embodiments of the seventh aspect. Details are not described again.

According to a thirteenth aspect, a communication method is further provided. The method includes: A PCRF obtains, from a home V2XCF, an NR PC5 QoS parameter that is of a terminal and that is used for NR PC5 V2X communication of the terminal, and sends the NR PC5 QoS parameter to an MME.

According to the method described in the thirteenth aspect, the PCRF obtains the NR PC5 QoS parameter of the terminal from the home V2XCF, and sends the obtained NR PC5 QoS parameter to an access network device through the MME, so that the access network device allocates, based on the NR PC5 QoS parameter, a communication resource for the terminal to perform the NR PC5 V2X communication. In this way, a feasible solution of notifying the access network device of the NR PC5 QoS parameter is provided.

In an embodiment, with reference to the thirteenth aspect, that the PCRF sends the NR PC5 QoS parameter to the mobility management entity MME includes: The PCRF sends an IP connectivity access network setup response to a PGW based on an IP connectivity access network setup request that is from the PGW and that is used to request a policy and charging control rule PCC rule of the terminal. The IP connectivity access network setup response includes the PCC rule of the terminal, and the PCC rule of the terminal includes the NR PC5 QoS parameter. The PGW receives the IP connectivity access network setup response, and sends a session setup response including a context of a PDN connection of the terminal to an SGW. The context of the PDN connection of the terminal includes the NR PC5 QoS parameter. The SGW receives the session setup response, and sends the session setup response to the MME.

Based on the embodiment, the NR PC5 QoS parameter of the terminal may be carried in the PCC rule of the terminal at the request of the PGW, the PCC rule that carries the NR PC5 QoS parameter is sent to the PGW by using an existing PDN connection setup procedure, and the PGW sends the NR PC5 QoS parameter to the MME through the SGW, so that the MME sends the NR PC5 QoS parameter to the access network device. In this way, the NR PC5 QoS parameter of the terminal is sent to the access network device by using the existing PDN connection setup procedure, so that signaling overheads are reduced, and the procedure is compatible with a communication procedure in an existing communications network.

In an embodiment, with reference to the thirteenth aspect, that the PCRF sends the NR PC5 QoS parameter to the mobility management entity MME includes: The PCRF sends an IP connectivity access network modification request including a PCC rule of the terminal to a PGW, where the PCC rule of the terminal includes the NR PC5 QoS parameter; or the PCRF sends an IP connectivity access network modification request including the NR PC5 QoS parameter to a PGW. The PGW receives the IP connectivity access network modification request, and sends a session modification request including the NR PC5 QoS parameter to an SGW. The SGW receives the session modification request, and sends the session modification request to the MME.

Based on the embodiment, when the NR PC5 QoS parameter of the terminal is updated, the PCRF may send the IP connectivity access network modification request including the updated NR PC5 QoS parameter to the MME, or may send the PCC rule including the NR PC5 QoS parameter to the MME. This is simple and easy to implement.

According to a fourteenth aspect, this application provides a communications apparatus. The communications apparatus may be a PCRF, a chip in a PCRF, or a system on chip. The communications apparatus may implement functions performed by the PCRF in the foregoing aspects or embodiments. The functions may be implemented by hardware, or may be implemented by hardware by executing corresponding software. The hardware or the software includes one or more modules corresponding to the foregoing functions. For example, the communications apparatus may include an obtaining unit and a sending unit.

The obtaining unit is configured to obtain, from a home V2XCF, an NR PC5 QoS parameter used for NR PC5 V2X communication of a terminal.

The sending unit is configured to send the NR PC5 QoS parameter to an MME.

For an implementation of the communications apparatus, refer to behavior functions of the PCRF in the communication method provided in any one of the thirteenth aspect or the embodiments of the thirteenth aspect. Any one of the thirteenth aspect or the embodiments of the thirteenth aspect may be correspondingly implemented by the obtaining unit and the sending unit that are included in the communications apparatus. For the implementation process, refer to descriptions in the following embodiments.

In an embodiment, with reference to the fourteenth aspect, the sending unit is configured to send an IP connectivity access network setup response to a PGW based on an IP connectivity access network setup request that is from the PGW and that is used to request a policy and charging control rule PCC rule of the terminal. The IP connectivity access network setup response includes the PCC rule of the terminal, and the PCC rule of the terminal includes the NR PC5 QoS parameter. The PGW receives the IP connectivity access network setup response, and sends a session setup response including a context of a PDN connection of the terminal to an SGW. The context of the PDN connection of the terminal includes the NR PC5 QoS parameter. The SGW receives the session setup response, and sends the session setup response to the MME.

Based on the embodiment, the NR PC5 QoS parameter of the terminal may be carried in the PCC rule of the terminal at the request of the PGW, the PCC rule that carries the NR PC5 QoS parameter is sent to the PGW by using an existing PDN connection setup procedure, and the PGW sends the NR PC5 QoS parameter to the MME through the SGW, so that the MME sends the NR PC5 QoS parameter to the access network device. In this way, the NR PC5 QoS parameter of the terminal is sent to the access network device by using the existing PDN connection setup procedure, so that signaling overheads are reduced, and the procedure is compatible with a communication procedure in an existing communications network.

In an embodiment, with reference to the fourteenth aspect, the sending unit is configured to send an IP connectivity access network modification request including a PCC rule of the terminal to a PGW, where the PCC rule of the terminal includes the NR PC5 QoS parameter; or the communications apparatus sends an IP connectivity access network modification request including the NR PC5 QoS parameter to a PGW. The PGW receives the IP connectivity access network modification request, and sends a session modification request including the NR PC5 QoS parameter to an SGW. The SGW receives the session modification request, and sends the session modification request to the MME.

Based on the embodiment, when the NR PC5 QoS parameter of the terminal is updated, the communications apparatus may send the IP connectivity access network modification request including the updated NR PC5 QoS parameter to the MME, or may send the PCC rule including the NR PC5 QoS parameter to the MME. This is simple and easy to implement.

According to a fifteenth aspect, a communications apparatus is provided, including a processor and a memory. The memory is configured to store a computer executable instruction. When the communications apparatus runs, the processor executes the computer executable instruction stored in the memory, so that the communications apparatus performs the communication method according to any one of the thirteenth aspect or the embodiments of the thirteenth aspect.

According to a sixteenth aspect, a computer-readable storage medium is provided. The computer-readable storage medium stores an instruction. When the instruction is run on a computer, the computer is enabled to perform the communication method according to any one of the thirteenth aspect or the embodiments of the foregoing aspects.

According to a seventeenth aspect, a computer program product including an instruction is provided. When the computer program product runs on a computer, the computer is enabled to perform the communication method according to any one of the thirteenth aspect or the embodiments of the foregoing aspect.

According to an eighteenth aspect, a chip system is provided. The chip system includes a processor and a communications interface, and is configured to support a communications apparatus in implementing functions in the foregoing aspects. For example, the processor obtains, from a home V2XCF through the communications interface, an NR PC5 QoS parameter used for NR PC5 V2X communication of the terminal, and sends the NR PC5 QoS parameter to an MME through the communications interface. In an embodiment, the chip system further includes a memory. The memory is configured to store a program instruction and data that are necessary for the communications apparatus. The chip system may include a chip, or may include a chip and another discrete device.

For a technical effect brought by any design manner in the fifteenth aspect to the eighteenth aspect, refer to the technical effect brought by any one of the thirteenth aspect or the embodiments of the thirteenth aspect. Details are not described again.

According to a nineteenth aspect, an embodiment of this application further provides a communication method. The method may include: A home V2XCF obtains an NR PC5 QoS parameter of a terminal, and sends the NR PC5 QoS parameter to a first network element that is in an EPS.

According to the method described in the nineteenth aspect, the home V2XCF obtains the NR PC5 QoS parameter of the terminal, and sends the obtained NR PC5 QoS parameter to the first network element that is in the EPS, so that the first network element sends the NR PC5 QoS parameter to an access network device through an MME, and the access network device allocates, based on the NR PC5 QoS parameter, a communication resource for the terminal to perform NR PC5 V2X communication. In this way, a feasible solution of notifying the access network device of the NR PC5 QoS parameter.

In an embodiment, with reference to the nineteenth aspect, the first network element is an HSS; or the first network element is a PCRF. Based on the embodiment, the home V2XCF may send the NR PC5 QoS parameter of the terminal to the MME through the HSS or the PCRF, and then the MME notifies the HSS of the NR PC5 QoS parameter. This is simple and easy to implement.

In an embodiment, with reference to the embodiments of the nineteenth aspect, when the first network element is the HSS, that a home V2XCF obtains an NR PC5 QoS parameter of a terminal includes: The home V2XCF receives a second request that is from the HSS and that is used to request the NR PC5 QoS parameter of the terminal, and obtains the NR PC5 QoS parameter based on the second request.

Based on the embodiment, the home V2XCF may send the NR PC5 QoS parameter of the terminal to the HSS at the request of the HSS. This is simple and easy to implement.

In an embodiment, with reference to the nineteenth aspect or the embodiments of the nineteenth aspect, the second request includes information about a visited PLMN of the terminal, and that the home V2XCF obtains the NR PC5 QoS parameter based on the second request includes: The home V2XCF sends, to a visited V2XCF of the terminal based on the information about the visited PLMN, a third request used to request a configuration parameter allowed to be used by the terminal in the visited network. The home V2XCF receives, from the visited V2XCF, a response that is to the third request and that includes the configuration parameter allowed to be used by the terminal in the visited network, and determines the NR PC5 QoS parameter based on a configuration parameter allowed to be used by the terminal in a home network and the configuration parameter allowed to be used by the terminal in the visited network.

Based on the embodiment, when the terminal is roaming, the home V2XCF obtains, from the visited V2XCF based on the information about the visited network in which the terminal is located, the configuration parameter allowed to be used by the terminal in the visited network, and then determines the NR PC5 QoS parameter of the terminal based on the configuration parameter allowed to be used by the terminal in the visited network and the configuration parameter allowed to be used by the terminal in the home network, thereby reducing the ease of implementation.

In an embodiment, with reference to the nineteenth aspect or the embodiments of the nineteenth aspect, the second request includes an identifier of the terminal, and that the home V2XCF obtains the NR PC5 QoS parameter based on the second request includes: The home V2XCF obtains, based on the identifier of the terminal, the NR PC5 QoS parameter from an NR PC5 QoS parameter stored in the home V2XCF.

Based on the embodiment, the NR PC5 QoS parameter of the terminal may be obtained from many locally stored NR PC5 QoS parameters based on the identifier of the terminal, so that design complexity of the home V2XCF is reduced. This is simple and easy to implement.

In an embodiment, with reference to the nineteenth aspect or the embodiments of the nineteenth aspect, that a home V2XCF obtains an NR PC5 QoS parameter of a terminal includes: The home V2XCF receives, through a packet data network PDN connection of a visited network, a first parameter request that is sent by the terminal and that is used to request the NR PC5 QoS parameter, sends, to a visited V2XCF of the terminal based on the first parameter request, a second parameter request used to request a configuration parameter allowed to be used by the terminal in the visited network, receives, from the visited V2XCF, a response that is to the second parameter request and that includes the configuration parameter allowed to be used by the terminal in the visited network, and determines the NR PC5 QoS parameter based on a configuration parameter allowed to be used by the terminal in a home network and the configuration parameter allowed to be used by the terminal in the visited network.

Based on the embodiment, when the terminal is roaming, the home V2XCF obtains, from the visited V2XCF based on the request of the terminal, the configuration parameter allowed to be used by the terminal in the visited network, and then determines the NR PC5 QoS parameter of the terminal based on the configuration parameter allowed to be used by the terminal in the visited network and the configuration parameter allowed to be used by the terminal in the home network, thereby reducing the ease of implementation.

According to a twentieth aspect, this application provides a communications apparatus. The communications apparatus may be a home V2XCF, a chip in a home V2XCF, or a system on chip. The communications apparatus may implement functions performed by the home V2XCF in the foregoing aspects or embodiments. The functions may be implemented by hardware, or may be implemented by hardware by executing corresponding software. The hardware or the software includes one or more modules corresponding to the foregoing functions. For example, the communications apparatus may include an obtaining unit and a sending unit.

The obtaining unit is configured to obtain an NR PC5 QoS parameter of a terminal.

The sending unit is configured to send the NR PC5 QoS parameter to a first network element that is in an EPS.

For an implementation of the communications apparatus, refer to behavior functions of the home V2XCF in the communication method provided in any one of the nineteenth aspect or the embodiments of the nineteenth aspect. Any one of the nineteenth aspect or the embodiments of the nineteenth aspect may be correspondingly implemented by the obtaining unit and the sending unit that are included in the communications apparatus. For the implementation process, refer to descriptions in the following embodiments.

In an embodiment, with reference to the twentieth aspect, the first network element is an HSS; or the first network element is a PCRF. Based on the embodiment, the communications apparatus may send the NR PC5 QoS parameter of the terminal to the MME through the HSS or the PCRF, and then the MME notifies the HSS of the NR PC5 QoS parameter. This is simple and easy to implement.

In an embodiment, with reference to the embodiment of the twentieth aspect, when the first network element is the HSS, the obtaining unit is configured to: receive a second request that is from the HSS and that is used to request the NR PC5 QoS parameter of the terminal, and obtain the NR PC5 QoS parameter based on the second request. Based on the embodiment, the communications apparatus may send the NR PC5 QoS parameter of the terminal to the HSS at the request of the HSS. This is simple and easy to implement.

In an embodiment, with reference to the twentieth aspect or the embodiment of the twentieth aspect, the second request includes information about a visited PLMN of the terminal, and the obtaining unit is configured to send, to a visited V2XCF of the terminal based on the information about the visited PLMN, a third request used to request a configuration parameter allowed to be used by the terminal in the visited network. The communications apparatus receives, from the visited V2XCF, a response that is to the third request and that includes the configuration parameter allowed to be used by the terminal in the visited network, and determines the NR PC5 QoS parameter based on a configuration parameter allowed to be used by the terminal in a home network and the configuration parameter allowed to be used by the terminal in the visited network.

Based on the embodiment, when the terminal is roaming, the communications apparatus obtains, from the visited V2XCF based on the information about the visited network in which the terminal is located, the configuration parameter allowed to be used by the terminal in the visited network, and then determines the NR PC5 QoS parameter of the terminal based on the configuration parameter allowed to be used by the terminal in the visited network and the configuration parameter allowed to be used by the terminal in the home network, thereby reducing the ease of implementation.

In an embodiment, with reference to the twentieth aspect or the embodiment of the twentieth aspect, the second request includes an identifier of the terminal, and the obtaining unit is configured to obtain, based on the identifier of the terminal, the NR PC5 QoS parameter from an NR PC5 QoS parameter stored in the communications apparatus.

Based on the embodiment, the NR PC5 QoS parameter of the terminal may be obtained from many locally stored NR PC5 QoS parameters based on the identifier of the terminal, so that design complexity of the communications apparatus is reduced. This is simple and easy to implement.

In an embodiment, with reference to the twentieth aspect or the embodiment of the twentieth aspect, the obtaining unit is configured to: receive, through a packet data network PDN connection of a visited network, a first parameter request that is sent by the terminal and that is used to request the NR PC5 QoS parameter, send, to a visited V2XCF of the terminal based on the first parameter request, a second parameter request used to request a configuration parameter allowed to be used by the terminal in the visited network, receive, from the visited V2XCF, a response that is to the second parameter request and that includes the configuration parameter allowed to be used by the terminal in the visited network, and determine the NR PC5 QoS parameter based on a configuration parameter allowed to be used by the terminal in a home network and the configuration parameter allowed to be used by the terminal in the visited network.

Based on the embodiment, when the terminal is roaming, the communications apparatus obtains, from the visited V2XCF based on the request of the terminal, the configuration parameter allowed to be used by the terminal in the visited network, and then determines the NR PC5 QoS parameter of the terminal based on the configuration parameter allowed to be used by the terminal in the visited network and the configuration parameter allowed to be used by the terminal in the home network, thereby reducing the ease of implementation.

According to a twenty-first aspect, a communications apparatus is provided, including a processor and a memory. The memory is configured to store a computer executable instruction. When the communications apparatus runs, the processor executes the computer executable instruction stored in the memory, so that the communications apparatus performs the communication method according to any one of the nineteenth aspect or the embodiments of the nineteenth aspect.

According to a twenty-second aspect, a computer-readable storage medium is provided. The computer-readable storage medium stores an instruction. When the instruction is run on a computer, the computer is enabled to perform the communication method according to any one of the nineteenth aspect or the embodiments of the foregoing aspects.

According to a twenty-third aspect, a computer program product including an instruction is provided. When the computer program product runs on a computer, the computer is enabled to perform the communication method according to any one of the nineteenth aspect or the embodiments of the foregoing aspects.

According to a twenty-fourth aspect, a chip system is provided. The chip system includes a processor and a communications interface, and is configured to support a communications apparatus in implementing functions in the foregoing aspects. For example, the processor obtains an NR PC5 QoS parameter of a terminal through the communications interface, and sends the NR PC5 QoS parameter to a first network element that is in an EPS through the communications interface. In an embodiment, the chip system further includes a memory. The memory is configured to store a program instruction and data that are necessary for the communications apparatus. The chip system may include a chip, or may include a chip and another discrete device.

For a technical effect brought by any design manner in the twenty-first aspect to the twenty-fourth aspect, refer to the technical effect brought by any one of the nineteenth aspect or the embodiments of the nineteenth aspect. Details are not described again.

According to a twenty-fifth aspect, a communications system is provided. The communications system may include the MME according to any one of the second aspect to the sixth aspect, the HSS according to any one of the eighth aspect to the twelfth aspect, and the home V2XCF according to any one of the twentieth aspect to the twenty-fourth aspect; or include the MME according to any one of the second aspect to the sixth aspect, the PCRF according to any one of the fourteenth aspect to the eighteenth aspect, and the home V2XCF according to any one of the twentieth aspect to the twenty-fourth aspect.

BRIEF DESCRIPTION OF DRAWINGS

FIG. 6A and FIG. 6B are a flowchart of another communication method according to an embodiment of this application;

DESCRIPTION OF EMBODIMENTS

The following describes implementations of embodiments of this application in detail with reference to the accompanying drawings.

The communication method provided in the embodiments of this application may be used in an evolved packet system (EPS) (or referred to as a 4th generation (4G) network). The following uses a system architecture shown in FIG. 1 as an example to describe the method provided in the embodiments of this application.

Figure 1:
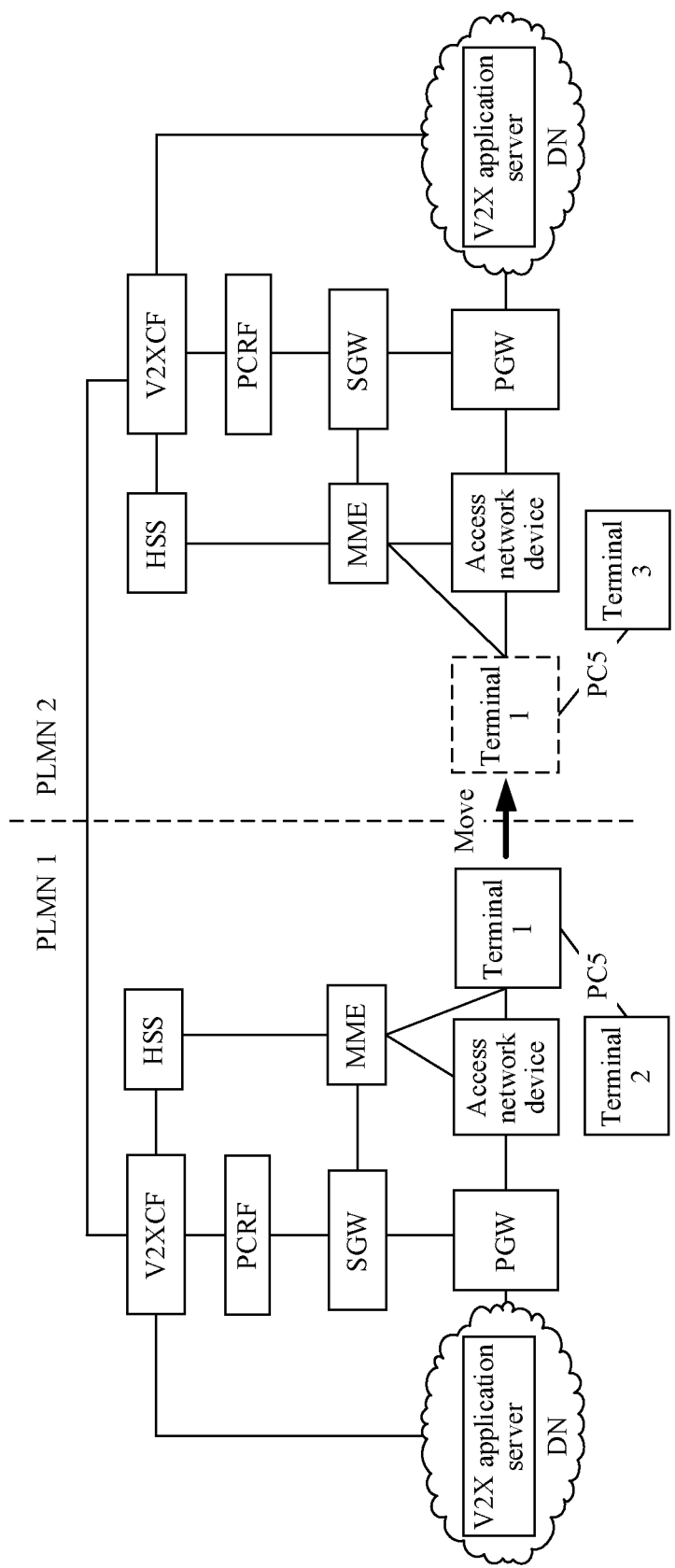
FIG. 1 is a diagram of a communications system according to an embodiment of this application.

FIG. 1 is a diagram of a communications system according to an embodiment of this application. As shown in FIG. 1, the communications system may include a plurality of public land mobile networks (PLMN) (for example, a PLMN 1 and a PLMN 2 in FIG. 1). Each PLMN may include: a terminal, an access network device, a mobility management entity (MME), a serving gateway (SGW), a packet data network gateway (PGW), a policy and charging rules function (PCRF), a home subscriber server (HSS), a V2X control function (V2XCF), and the like. The communications system may further include a data network (DN), and the DN may include a V2X application server. A connection relationship between network elements is shown in FIG. 1. The terminal may be connected to the access network device through a Uu interface, the access network device is connected to the MME and the PGW, the PGW is connected to the SGW and the DN, the MME is connected to the SGW and the HSS, the SGW is connected to the PCRF, the HSS and the PCRF are connected to the V2XCF, and the like.

The terminal may be referred to as terminal device (terminal equipment), user equipment (UE), a mobile station (MS), a mobile terminal (MT), or the like. The terminal may be a mobile phone, a tablet computer, or a computer with a wireless transceiver function, or may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a smart home, a vehicle-mounted terminal, or the like. In this embodiment of this application, NR PC5 V2X communication may be performed between terminals.

The access network device is mainly configured to implement functions such as resource scheduling, radio resource management, radio access control of the terminal, and functions such as mobility management. The access network device may be an evolved universal terrestrial radio access network (E-UTRAN) device, or may be an access network (AN)/radio access network (RAN) device, or may be a NodeB (NB), an evolved NodeB (eNB), a transmission reception point (TRP), a transmission point (TP), and any node of another access node.

The SGW is mainly configured to implement session management functions such as setup, release, and modification of a user plane transmission logical channel (for example, an EPS bearer (bearer)).

The PGW may be used as an anchor on the user plane transmission logical channel, and is mainly configured to complete functions such as routing and forwarding of user plane data. For example, the PGW establishes a channel (that is, the user plane transmission logical channel) between the PGW and the terminal, forwards a data packet between the terminal and the DN on the channel, and is responsible for data packet filtering, data forwarding, rate control, generation of charging information, and the like for the terminal.

The MME is mainly responsible for all control plane functions, security functions, and the like of user status management, mobility management, and session management. The user status management includes registration status management and connection status management. The mobility management includes user registration and network access, tracking area update, and handover; all control plane functions of the session management include, for example, session establishment, EPC bearer setup/modification/release, and a selection of the PGW and the SGW. The security function includes user authentication and key security management.

The PCRF is configured to manage a policy and charging rule (PCC rule) of the terminal. For example, the PCRF is mainly responsible for policy control and charging control of the terminal, and provides a user plane gateway device with control policies such as service data flow detection, gating control, QoS, and charging.

The HSS provides subscription data management and authentication functions of a user. The subscription data management function includes storing subscription information and context information, for example, a subscriber identifier, a number, routing information, security information, and location information, of the user.

The V2XCF is mainly used to configure, for the terminal, V2X communication parameters for a PC5 interface and the Uu interface. Different V2XCFs may be connected to each other. As shown in FIG. 1, the V2XCF in the PLMN 1 may be connected to the V2XCF in the PLMN 2, and the like.

In the system shown in FIG. 1, the terminal has mobility, and the terminal may be located in a home network, that is, in a non-roaming scenario, or may move to a visited network, that is, in a roaming scenario. As shown in FIG. 1, assuming that a subscription network of a terminal 1 is the PLMN 1, when the terminal 1 is located in the PLMN 1, the terminal 1 is in the non-roaming scenario; or when the terminal 1 moves to the PLMN 2, the terminal 1 is in the roaming scenario. Regardless of whether the terminal is in the non-roaming scenario or the roaming scenario, when the terminal needs to perform NR PC5 V2X communication with another terminal, to enable the access network device to obtain an NR PC5 QoS parameter of the terminal and allocate, based on the obtained NR PC5 QoS parameter of the terminal, a communication resource for the terminal to perform the NR PC5 V2X communication, this embodiment of this application provides the following embodiments.

In an embodiment, the NR PC5 QoS parameter of the terminal is carried in subscription data of the terminal, and the HS S sends, by using a sending procedure of the subscription data of the terminal, the NR PC5 QoS parameter to the access network device through the MME. For example, the terminal requests the MME to perform a network registration on the terminal, and the MME requests the subscription data (including the NR PC5 QoS parameter of the terminal) from the HSS, and sends the requested subscription data to the access network device. For the embodiment, refer to the descriptions in the following embodiments corresponding to FIG. 4 to FIG. 6A and FIG. 6B.

In another embodiment, the NR PC5 QoS parameter of the terminal is carried in the PCC rule, and the PCRF sends, by using a PDN connection setup procedure or a PDN connection modification procedure, the NR PC5 QoS parameter to the access network device through the MME. For example, the PCRF sends the PCC rule including the NR PC5 QoS parameter of the terminal to the PGW, the PGW sends the NR PC5 QoS parameter of the terminal to the MME through the SGW, and the MME sends the received NR PC5 QoS parameter to the access network device. For an embodiment, refer to the descriptions in the embodiment corresponding to FIG. 7A and FIG. 7B or FIG. 8A and FIG. 8B.

It should be noted that FIG. 1 is merely an example architectural diagram. A quantity of network elements included in the communications system shown in FIG. 1 is not limited in this embodiment of this application. Although not shown, in addition to the network functional entity shown in FIG. 1, the network shown in FIG. 1 may further include another functional entity. For example, the network may further include a monitoring module, and the monitoring module is configured to monitor a working status of each device in the network. In addition, names of devices in FIG. 1 and names of interfaces between the devices are not limited. In addition to the names shown in FIG. 1, each device may further have another name, for example, may be replaced with a name of a network element that has a same or similar function. This is not limited.

Figure 2:
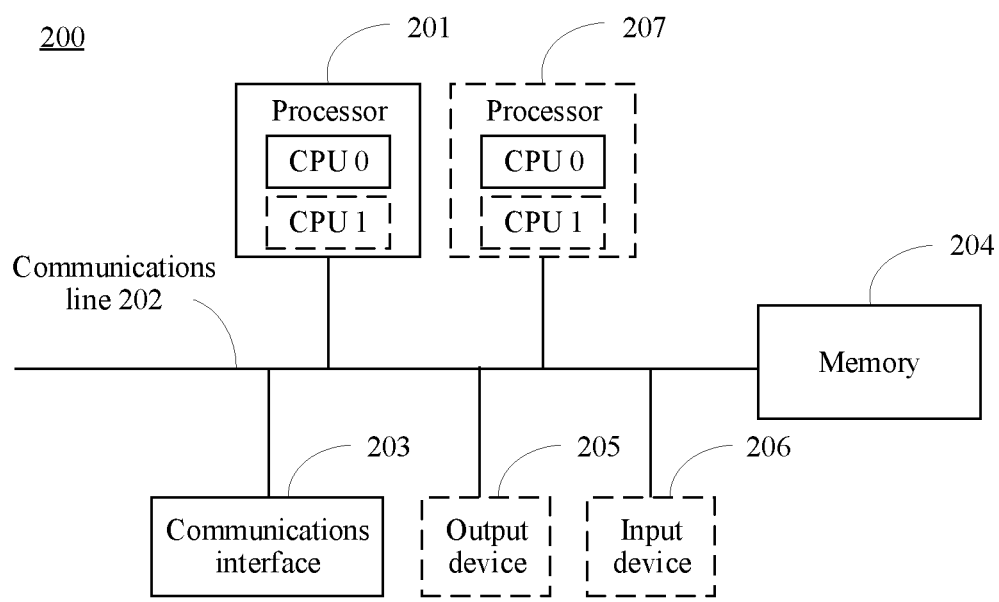
FIG. 2 is a diagram of a communications apparatus 200 according to an embodiment of this application.

In an implementation, the devices (for example, the MME, the HSS, the PCRF, and the V2XCF) shown in FIG. 1 may use a composition structure shown in FIG. 2, or include components shown in FIG. 2.

FIG. 2 is a diagram of a communications apparatus 200 according to an embodiment of this application. The communications apparatus 200 may be a centralized controller or a chip or a system on chip in a centralized controller, or may be a functional entity or a chip or a system on chip in a functional entity. The communications apparatus 200 includes a processor 201, a communications line 202, and a communications interface 203.

Further, the communications apparatus 200 may include a memory 204. The processor 201, the memory 204, and the communications interface 203 may be connected to each other through the communications line 202.

The processor 201 may be a central processing unit (CPU), a general-purpose processor, a network processor (NP), a digital signal processor (DSP), a microprocessor, a microcontroller, a programmable logic device (PLD), or any combination thereof. Alternatively, the processor 201 may be any other apparatus having a processing function, for example, a circuit, a component, or a software module. This is not limited.

The communications line 202 is used to transmit information between components included in the communications apparatus 200.

The communications interface 203 is configured to communicate with another device or another communications network. The another communications network may be Ethernet, a radio access network (RAN), a wireless local area network (WLAN), or the like. The communications interface 203 may be a module, a circuit, a transceiver, or any apparatus that can implement communication.

The memory 204 is configured to store an instruction. The instruction may be a computer program.

The memory 204 may be a read-only memory (ROM) or another type of static storage device that can store static information and/or an instruction, or may be a random access memory (RAM) or another type of dynamic storage device that can store information and/or an instruction, an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or the like. This is not limited.

It should be noted that the memory 204 may exist independently of the processor 201, or may be integrated with the processor 201. The memory 204 may be configured to store an instruction, program code, some data, or the like. The memory 204 may be located inside the communications apparatus 200, or may be located outside the communications apparatus 200. This is not limited.

The processor 201 is configured to execute the instruction stored in the memory 204, to implement the communication method provided in this application.

In an example, the processor 201 may include one or more CPUs, for example, a CPU 0 and a CPU 1 in FIG. 2.

In an optional implementation, the communications apparatus 200 includes a plurality of processors. For example, in addition to the processor 201 in FIG. 2, the communications apparatus 200 may further include a processor 207.

In an optional implementation, the communications apparatus 200 further includes an output device 205 and an input device 206. For example, the input device 206 is a device, for example, a keyboard, a mouse, a microphone, or a joystick, and the output device 205 is a device, for example, a display screen or a speaker.

It should be noted that the communications apparatus 200 may be a desktop computer, a portable computer, a network server, a mobile phone, a tablet computer, a wireless terminal, an embedded device, a chip system, or a device with a structure similar to that in FIG. 2. In addition, the composition structure shown in FIG. 2 does not constitute a limitation on the communications apparatus. In addition to the components shown in FIG. 2, the communications apparatus may include more or fewer components than those shown in the figure, or combine some components, or have different component arrangements.

In this embodiment of this application, a chip system may include a chip, or may include a chip and another discrete device.

In addition, for actions, terms, and the like in the embodiments of this application, reference may be made to each other. This is not limited. In the embodiments of this application, names of messages exchanged between devices, names of parameters in the messages, or the like are merely examples. In an implementation, other names may alternatively be used. This is not limited. For example, a general message in the following embodiment may also be replaced with a processing message and the like. This is not limited.

The following uses the architecture shown in FIG. 1 as an example to describe the communication method provided in the embodiments of this application. The network element described in the following embodiment may have the components shown in FIG. 2.

Figure 3:
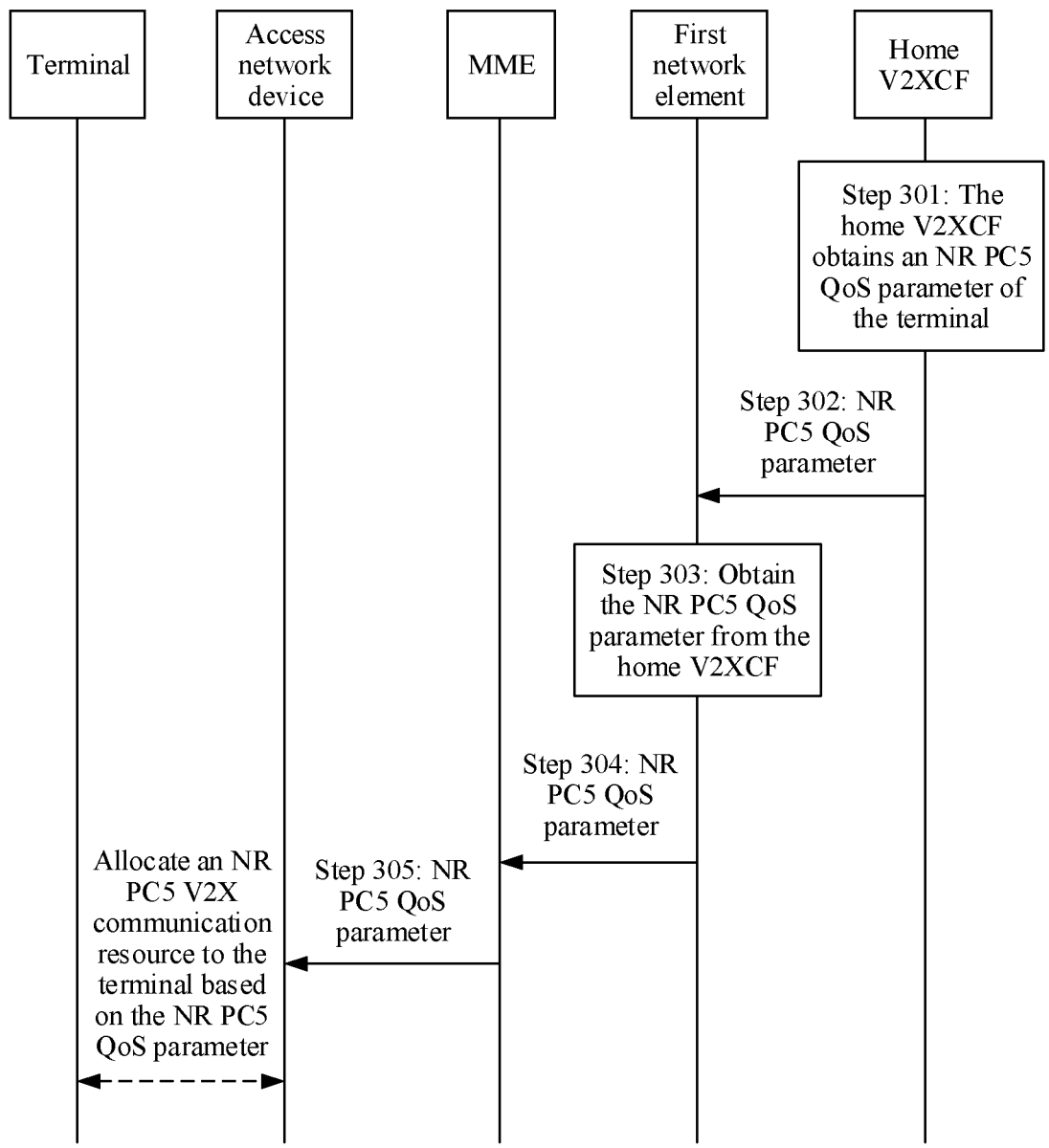
FIG. 3 is a flowchart of a communication method according to an embodiment of this application.

FIG. 3 shows a communication method according to an embodiment of this application. The communication method is used to send an NR PC5 QoS parameter of a terminal to an access network device, so that the access network device schedules an NR PC5 V2X communication resource for the terminal based on the NR PC5 QoS parameter of the terminal, and the terminal performs NR PC5 V2X communication on the NR PC5 V2X communication resource scheduled by the access network device. The terminal in the following embodiment may be any terminal in the system shown in FIG. 1. The terminal has mobility, and may be in a non-roaming scenario, or may be in a roaming scenario. For example, the terminal in the following embodiment may be the terminal 1 in the system shown in FIG. 1, a home network of the terminal is a PLMN 1, and the terminal 1 may be located in the PLMN 1 or may roam to a PLMN 2. As shown in FIG. 3, the communication method may include the following steps.

Step 301: A home V2XCF obtains the NR PC5 QoS parameter of the terminal.

The home V2XCF may be a V2XCF in a home network (or referred to as a subscription network) of the terminal. The home network of the terminal may be a home PLMN of the terminal. For example, assuming that the terminal is the terminal 1 in FIG. 1, and the home network of the terminal is the PLMN 1, the home V2XCF is a V2XCF in the PLMN 1. It should be noted that, in this embodiment of this application, one terminal may correspond to one home V2XCF.

The NR PC5 QoS parameter of the terminal may be used by the terminal to perform the NR PC5 V2X communication. The NR PC5 QoS parameter of the terminal may also be described as an NR PC5 V2X communications parameter of the terminal, an NR PC5 QoS profile (profile), or another name. This is not limited. The NR PC5 QoS parameter of the terminal may include one or more pieces of information such as a PC5 quality identifier (PQI), a PC5 flow bit rate, a PC5 link aggregated bit rate, and a communication range of the terminal. For ease of description, in the following embodiments, the NR PC5 QoS parameter of the terminal is referred to as an NR PC5 QoS parameter for short, that is, the NR PC5 QoS parameter in the following is the NR PC5 QoS parameter of the terminal.

In this embodiment of this application, based on whether the terminal is roaming, the NR PC5 QoS parameter of the terminal may be divided into the following two parameters: an NR PC5 QoS parameter used by the terminal to perform NR PC5 V2X communication in a visited network (referred to as an NR PC5 QoS parameter of the terminal in the visited network for short), and an NR PC5 QoS parameter used by the terminal to perform NR PC5 V2X communication in the home network (referred to as an NR PC5 QoS parameter of the terminal in the home network). For example, when the terminal is in the roaming scenario, the terminal is located in a visited PLMN, the terminal performs NR PC5 V2X communication with another terminal that is in a roaming area. In this case, the NR PC5 QoS parameter of the terminal is the NR PC5 QoS parameter used by the terminal to perform the NR PC5 V2X communication in the visited network. However, when the terminal is in the non-roaming scenario, the terminal is located in the home PLMN, the terminal performs NR PC5 V2X communication with another terminal that is in the home network. In this case, the NR PC5 QoS parameter of the terminal is the NR PC5 QoS parameter used by the terminal to perform the NR PC5 V2X communication in the home network.

The NR PC5 QoS parameter of the terminal in the home network may be pre-configured by an operator in the home V2XCF. It should be noted that, in addition to the NR PC5 QoS parameter of the terminal, another configuration parameter allowed to be used by the terminal in the home network may be pre-configured in the home V2XCF. This is not limited.

The NR PC5 QoS parameter of the terminal in the visited network may be determined by the home V2XCF based on a configuration parameter allowed to be used by the terminal in the home network and a configuration parameter allowed to be used by the terminal in the visited network.

Configuration parameters allowed to be used by the terminal in the visited network may include the PQI of the terminal, the PC5 flow bit rate, the PC5 link aggregated bit rate, the communication range, whether the terminal performs PC5 communication in the visited network, whether the terminal performs multimedia broadcast multicast service (MBMS) communication in the visited network, an identifier of a V2X application service (for example, a fully qualified domain name (FQDN) of the terminal or an internet protocol address (IP address) of the terminal) used by the terminal in the visited network, geographical information of the V2X application service of the terminal, and the like. For example, the home V2XCF may obtain, from a visited V2XCF, the configuration parameter allowed to be used by the terminal in the visited network. For example, the home V2XCF may send a request to the visited V2XCF, to request the configuration parameter allowed to be used by the terminal in the visited network. The visited V2XCF receives the request of the home V2XCF, and sends, to the home V2XCF, the configuration parameter allowed to be used by the terminal in the visited network.

Configuration parameters allowed to be used by the terminal in the home network may include the PQI of the terminal, the PC5 flow bit rate, the PC5 link aggregated bit rate, the communication range, whether the terminal performs PC5 communication in the home network, whether the terminal performs MBMS communication in the home network, an identifier of a V2X application service used by the terminal in the home network, geographical information of the V2X application service of the terminal, and the like.

For example, the home V2XCF may determine an intersection set of the configuration parameters allowed to be used by the terminal in the home network and the configuration parameters allowed to be used by the terminal in the visited network as the NR PC5 QoS parameter of the terminal in the visited network. For example, if the configuration parameters allowed to be used by the terminal in the home network include {a PQI 1 of the terminal, a PC5 flow bit rate 1, and a communication range 1}, and the configuration parameters allowed to be used by the terminal in the visited network include {the PQI 1 of the terminal, a PC5 flow bit rate 2, and the communication range 1}, the home V2XCF determines, based on the intersection set of the configuration parameters allowed to be used by the terminal in the home network and the configuration parameters allowed to be used by the terminal in the visited network, that NR PC5 QoS parameters of the terminal in the visited network are {the PQI 1 of the terminal and the communication range 1}.

Step 302: The home V2XCF sends the NR PC5 QoS parameter to a first network element that is in an EPS, or this may be described as follows: The home V2XCF sends the NR PC5 QoS parameter to a first network element that is in a 4G network.

In an embodiment, the first network element is an HSS in the home network of the terminal. In the embodiment, the terminal may be in the non-roaming scenario, or may be in the roaming scenario. This is not limited. For example, it is assumed that the terminal is the terminal 1 in FIG. 1, the home network of the terminal is the PLMN 1, and regardless of whether the terminal 1 is located in the PLMN 1 or the PLMN 2, the first network element is an HSS in the PLMN 1.

In an embodiment, once obtaining the NR PC5 QoS parameter of the terminal, the home V2XCF sends the NR PC5 QoS parameter to the HSS; or the home V2XCF receives a request that is sent by the HSS and that is used to request the NR PC5 QoS parameter, and sends the NR PC5 QoS parameter to the HSS based on the request of the HSS. This is not limited.

In another embodiment, the first network element is a PCRF. When the terminal is in the non-roaming scenario, the PCRF is a PCRF in the home network of the terminal, that is, a home PCRF (H-PCRF for short) of the terminal. When the terminal is in the roaming scenario, the first network element is a PCRF in the visited network of the terminal, that is, a visited PCRF (V-PCRF for short) of the terminal. For example, assuming that the terminal is the terminal 1 in FIG. 1, and the home network of the terminal is the PLMN 1, when the terminal is in the non-roaming scenario, the first network element is a PCRF in the PLMN 1; when the terminal 1 roams from the PLMN 1 to the PLMN 2, the first network element is a PCRF in the PLMN 2.

In an embodiment, once obtaining the NR PC5 QoS parameter of the terminal, the home V2XCF sends the NR PC5 QoS parameter to the PCRF.

Step 303: The first network element obtains the NR PC5 QoS parameter from the home V2XCF.

When the first network element is the HSS, the first network element may receive the NR PC5 QoS parameter actively sent by the home V2XCF, or may send a request to the home V2XCF, to request the home V2XCF to send the NR PC5 QoS parameter to the first network element. This is not limited. For the obtaining process, refer to the descriptions in the following embodiments corresponding to FIG. 4 to FIG. 6A and FIG. 6B.

When the first network element is the PCRF, the first network element may receive the NR PC5 QoS parameter actively sent by the home V2XCF. The obtaining process may be described in the following embodiments corresponding to FIG. 7A and FIG. 7B and FIG. 8A and FIG. 8B.

Step 304: The first network element sends the NR PC5 QoS parameter to an MME.

The MME may be an MME that currently provides a core network service for the terminal. For example, when the terminal is in the roaming scenario, the MME is an MME (referred to as a V-MME for short) of the terminal in the visited network. When the terminal is in the non-roaming scenario, the MME is an MME (referred to as an H-MME for short) of the terminal in the home network.

For example, the terminal is the terminal 1 in FIG. 1, and the home network of the terminal is the PLMN 1. When the terminal is in the non-roaming scenario, the MME is an MME in the PLMN 1. When the terminal 1 roams from the PLMN 1 to the PLMN 2, the MME is an MME in the PLMN 2.

For example, when the first network element is the HSS, the first network element may send, to the MME, subscription data that is of the terminal and that includes the NR PC5 QoS parameter. For the sending process, refer to the descriptions in the following embodiments corresponding to FIG. 4 to FIG. 6A and FIG. 6B.

When the first network element is the PCRF, the first network element may send, to a PGW, a PCC rule that is of the terminal and that includes the NR PC5 QoS parameter, and the PGW sends the NR PC5 QoS parameter that is in the PCC rule to the MME. For the sending process, refer to the descriptions in the following embodiments corresponding to FIG. 7A and FIG. 7B and FIG. 8A and FIG. 8B.

Step 305: The MME obtains the NR PC5 QoS parameter, and sends the NR PC5 QoS parameter to the access network device.

The access network device may be a device that currently provides an access service for the terminal. When the terminal is in the roaming scenario, the access network device is an access device of the terminal in the visited network. When the terminal is in the non-roaming scenario, the access network device is an access device of the terminal in the home network.

For example, the terminal is the terminal 1 in FIG. 1, and the home network of the terminal is the PLMN 1. When the terminal is in the non-roaming scenario, the access network device is an access network device in the PLMN 1. When the terminal 1 roams from the PLMN 1 to the PLMN 2, the access network device is an access network device in the PLMN 2.

In an embodiment, that the MME obtains the NR PC5 QoS parameter includes: The MME obtains the NR PC5 QoS parameter from the HSS. For example, the NR PC5 QoS parameter is included in the subscription data of the terminal, and the MME receives, from the HSS, the subscription data that is of the terminal and that includes the NR PC5 QoS parameter. For the embodiment, refer to the descriptions in the embodiments corresponding to FIG. 4 and FIG. 5.

In an embodiment, that the MME obtains the NR PC5 QoS parameter includes: The MME obtains the NR PC5 QoS parameter from the PCRF. For example, the NR PC5 QoS parameter is included in the PCC rule of the terminal, and the MME may obtain the NR PC5 QoS parameter from the PCRF by using a session setup procedure; or the MME may obtain the NR PC5 QoS parameter from the PCRF by using a session modification procedure. For the embodiment, refer to the descriptions in the embodiment corresponding to FIG. 7A and FIG. 7B or FIG. 8A and FIG. 8B.

For example, after the MME obtains the NR PC5 QoS parameter, the MME may send the NR PC5 QoS parameter to the access network device through a communication link between the MME and the access network device.

Further, optionally, the access network device receives the NR PC5 QoS parameter, and allocates an NR PC5 V2X communication resource to the terminal based on the NR PC5 QoS parameter, so that the terminal performs NR PC5 V2X communication with another terminal based on the NR PC5 V2X communication resource allocated by the access network device.

Further, optionally, the MME stores the NR PC5 QoS parameter, for example, stores the NR PC5 QoS parameter in a context of the terminal. Subsequently, the MME may obtain the NR PC5 QoS parameter locally and send the NR PC5 QoS parameter to the access network device. The MME does not need to interact with the HSS or the PCRF to obtain the NR PC5 QoS parameter, thereby reducing signaling overheads.

According to the method shown in FIG. 3, the home V2XCF may send the NR PC5 QoS parameter to the MME through the first network element, and the MME sends the NR PC5 QoS parameter to the access network device. This resolves a problem of how to notify the access network device of the NR PC5 QoS parameter of the terminal.

Figure 4:
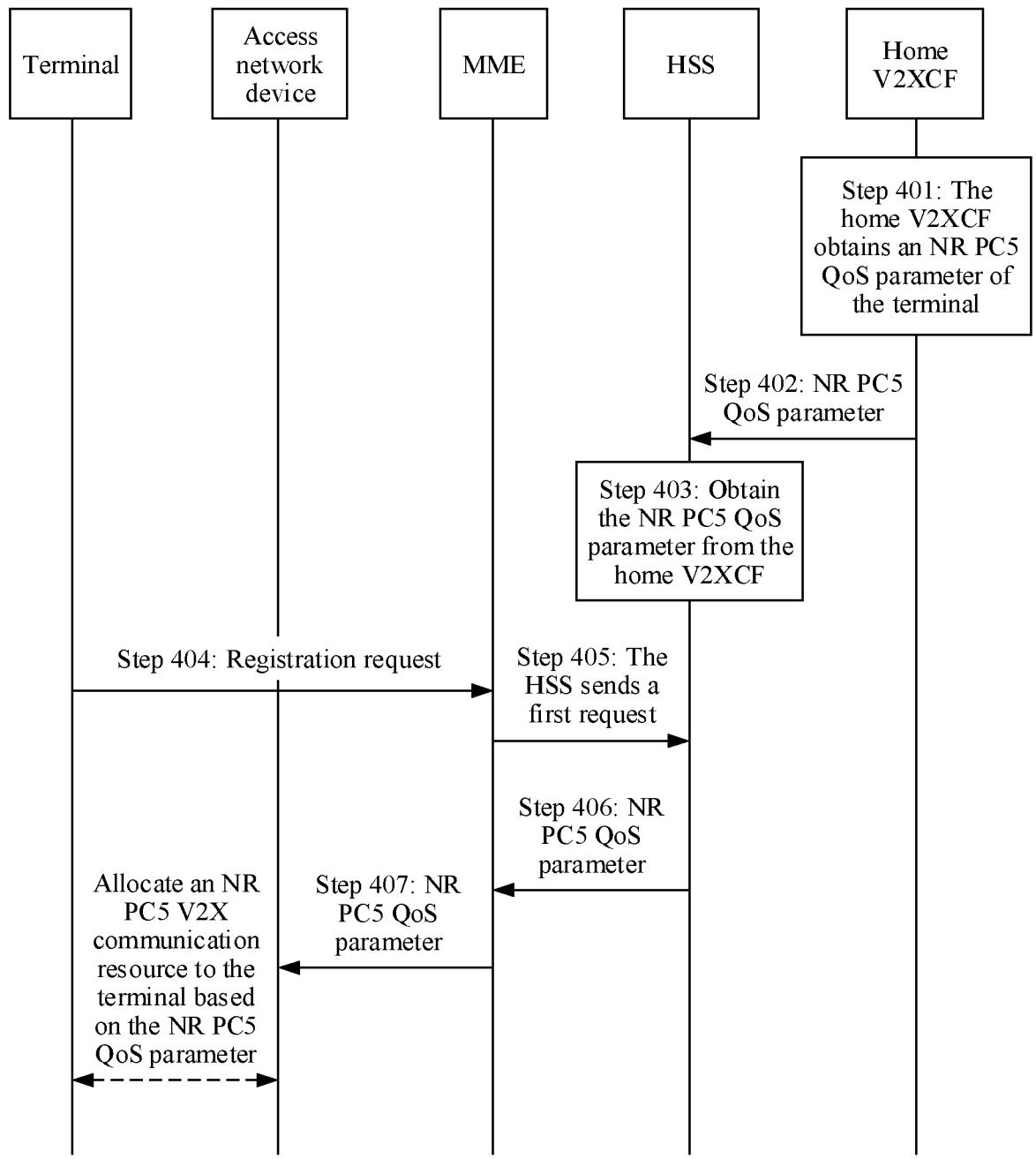
FIG. 4 is a flowchart of another communication method according to an embodiment of this application.

With reference to FIG. 4, the following describes the method shown in FIG. 3 by using an example in which the terminal is in the non-roaming scenario and the first network element is the HSS. The MME in FIG. 4 may be referred to as a home MME (H-MME), and the access network device may be referred to as a home access network device (H-access network device). The NR PC5 QoS parameter in the method shown in FIG. 4 may be the NR PC5 QoS parameter in the home network of the terminal.

FIG. 4 is a communication method according to an embodiment of this application. As shown in FIG. 4, the method may include the following steps.

Step 401: A home V2XCF obtains an NR PC5 QoS parameter of a terminal.

The NR PC5 QoS parameter in the method shown in FIG. 4 may be an NR PC5 QoS parameter in a home network of the terminal. When the terminal subscribes to a network, an operator may pre-store the NR PC5 QoS parameters of the terminal in the home V2XCF.

It should be noted that the NR PC5 QoS parameter in the home V2XCF may be dynamically updated based on a network usage status or other information. For example, the NR PC5 QoS parameter of the terminal corresponds to a V2X service that the terminal subscribes to. If V2X services that the terminal initially subscribes to are a V2X service 1, a service 2, and a service 3, and subsequently, the V2X service that the terminal subscribes to is updated, for example, if a service 4 and a service 5 are added, or the service 3 is deleted, the NR PC5 QoS parameter of the terminal changes. For example, an NR PC5 QoS requirement is higher than an NR PC5 QoS requirement that is in subscription of the terminal, the home V2XCF needs to update in real time, based on the change of the V2X service that the terminal subscribes to, a V2X service that the terminal subscribes to and that is stored in the home V2XCF. In other words, the NR PC5 QoS parameter in step 401 may be an NR PC5 QoS parameter when the terminal accesses the network, or may be an NR PC5 QoS parameter updated after the terminal subscribes to a network.

Step 402: The home V2XCF sends the NR PC5 QoS parameter to an HSS.

For example, the home V2XCF may directly send the NR PC5 QoS parameter to the HSS, or the home V2XCF sends the NR PC5 QoS parameter to the HSS through a service capability exposure function (SCEF). This is not limited.

Step 403: The HSS receives the NR PC5 QoS parameter from the home V2XCF.

Further, optionally, the HSS stores the received NR PC5 QoS parameter in subscription data of the terminal.

Step 404: The terminal sends a registration request to an MME.

The registration request may be used to request to register the terminal with a network (or referred to as an EPS network). The registration request may be an attach request or a tracking area update (TAU) request.

The registration request may include an identifier of the terminal, and may further include other information, for example, may further include V2X capability information of the terminal. The identifier of the terminal may be used to identify the terminal, and the V2X capability information of the terminal may be used to indicate that the terminal has an NR PC5 V2X communication capability.

For example, the terminal may send the registration request to the MME through an access network device.

Step 405: The MME receives the registration request, and sends a first request to the HSS based on the registration request.

The first request may be used to request the subscription data of the terminal. A name of the first request is not limited in this embodiment of this application. The first request may be referred to as an update location request or may have another name. This is not limited.

The first request may include the identifier of the terminal or other information. This is not limited.

For example, that the MME sends the first request to the HSS based on the registration request may include: The registration request is used as a trigger condition for the MME to send the first request to the HSS. Once receiving the registration request of the terminal, the MME sends the first request to the HSS. Alternatively, after receiving the registration request, the MME queries whether the MME stores the subscription data of the terminal. If the MME finds that the MME does not store the subscription data of the terminal, the MME sends the first request to the HSS.

Step 406: The HSS receives the first request, and sends the NR PC5 QoS parameter to the MME based on the first request.

The NR PC5 QoS parameter may be carried in the subscription data of the terminal.

For example, that the HSS sends the NR PC5 QoS parameter to the MME based on the first request may include: The HSS obtains, based on the identifier that is of the terminal that is included in the first request, the subscription data of the terminal from subscription data stored in the HSS, and sends the subscription data to the MME. For example, the HSS uses the identifier of the terminal as an index to query a correspondence between an identifier and subscription data that are of a terminal and that are stored in the HSS, finds subscription data corresponding to the identifier that is of the terminal and that is included in the first request, and sends the found subscription data to the MME.

For example, the HSS may send, to the MME, a response that is to the first request and that includes the subscription data of the terminal. When the first request is an update location request, the response to the first request may be an update location ack.

For example, Table 1 is the subscription data stored in the HSS. As shown in Table 1, when the first request received by the HSS includes an identifier of a terminal 1, the HSS may query Table 1 by using the terminal 1 as an index, and send found subscription data 1 to the MME.

TABLE 1

| Terminal | Subscription data |
|---|---|
| Terminal 1 | Subscription data 1 |
| Terminal 2 | Subscription data 2 |
| Terminal 3 | Subscription data 3 |

Step 407: The MME receives the NR PC5 QoS parameter, and sends the NR PC5 QoS parameter to the access network device.

For example, when the NR PC5 QoS parameter is carried in the subscription data of the terminal, after receiving the subscription data of the terminal, the MME may obtain the NR PC5 QoS parameter from the subscription data of the terminal, and send the NR PC5 QoS parameter to the access network device.

For example, the MME may send an initial context setup request including the NR PC5 QoS parameter to the access network device.

Further, optionally, after receiving the NR PC5 QoS parameter, the MME stores the received NR PC5 QoS parameter in the MME, for example, stores the received NR PC5 QoS parameter in a context of the terminal. Subsequently, when the MME receives the registration request of the terminal again, the MME may send, to the access network device, the NR PC5 QoS parameter stored in the MME. The MME does not need to interact with the HSS to obtain the NR PC5 QoS parameter and send the NR PC5 QoS parameter to the access network device, thereby reducing signaling overheads.

Further, optionally, the access network device receives the NR PC5 QoS parameter sent by the MME, and stores the received NR PC5 QoS parameter in the access network device. Subsequently, when the terminal performs NR PC5 V2X communication, the access network device may allocate an NR PC5 V2X communication resource to the terminal based on the NR PC5 QoS parameter, so that the terminal performs the NR PC5 V2X communication based on the NR PC5 V2X communication resource allocated by the access network device.

It should be noted that, in the method shown in FIG. 4, the NR PC5 QoS parameter may further be directly stored in the subscription data that is in the HSS, and the NR PC5 QoS parameter does not need to be stored in the home V2XCF. In this way, the HSS may obtain the NR PC5 QoS parameter locally, and there is no need to obtain the NR PC5 QoS parameter through signaling interaction between the home V2XCF and the HSS, thereby reducing the signaling overheads. In other words, step 401 to step 403 may be replaced with the following: The HSS obtains the NR PC5 QoS parameter of the terminal. A method for obtaining the NR PC5 QoS parameter by the HSS is the same as the process of obtaining the NR PC5 QoS parameter by the home V2XCF in step 401. Details are not described again.

In addition, in the method shown in FIG. 4, after the terminal successfully registers with the network, if the NR PC5 QoS parameter in the home V2XCF is updated, the home V2XCF may send an updated NR PC5 QoS parameter to the HSS, the HSS sends the updated NR PC5 QoS parameter to the MME, and the MME sends the updated NR PC5 QoS parameter to the access network device, so that the access network device adjusts, based on the updated NR PC5 QoS parameter, the NR PC5 V2X communication resource allocated by the access network device to the terminal.

That the HSS sends the updated NR PC5 QoS parameter to the MME may include: The HSS sends a subscription data update message including the updated NR PC5 QoS parameter to the MME. Alternatively, the HSS replaces an original NR PC5 QoS parameter that is in the subscription data of the terminal with the updated NR PC5 QoS parameter, and sends the subscription data update message including replaced subscription data of the terminal to the MME. This is not limited.

According to the method shown in FIG. 4, when the terminal is in a non-roaming scenario, the home V2XCF sends the NR PC5 QoS parameter to the HSS, the HSS sends the subscription data including the NR PC5 QoS parameter to the MME, and then the MME sends the subscription data to the access network device. In this way, a problem of how to send the NR PC5 QoS parameter to the access network device is resolved. In addition, the NR PC5 QoS parameter is sent to the access network device by using an existing registration procedure, thereby reducing the signaling overheads and ensuring system compatibility.

In an embodiment, when the terminal is in a roaming scenario, the home V2XCF may send, by using the existing registration procedure, the NR PC5 QoS parameter of the terminal in a visited network to the MME through the HSS, and then the MME sends the NR PC5 QoS parameter to the access network device. For the process, refer to the descriptions in FIG. 5. It should be noted that the MME in FIG. 5 may be referred to as a visited MME (V-MME), and the access network device may be referred to as a visited access network device (V-access network device). The NR PC5 QoS parameter in the method shown in FIG. 5 may be the NR PC5 QoS parameter in the visited network of the terminal.

Figure 5:
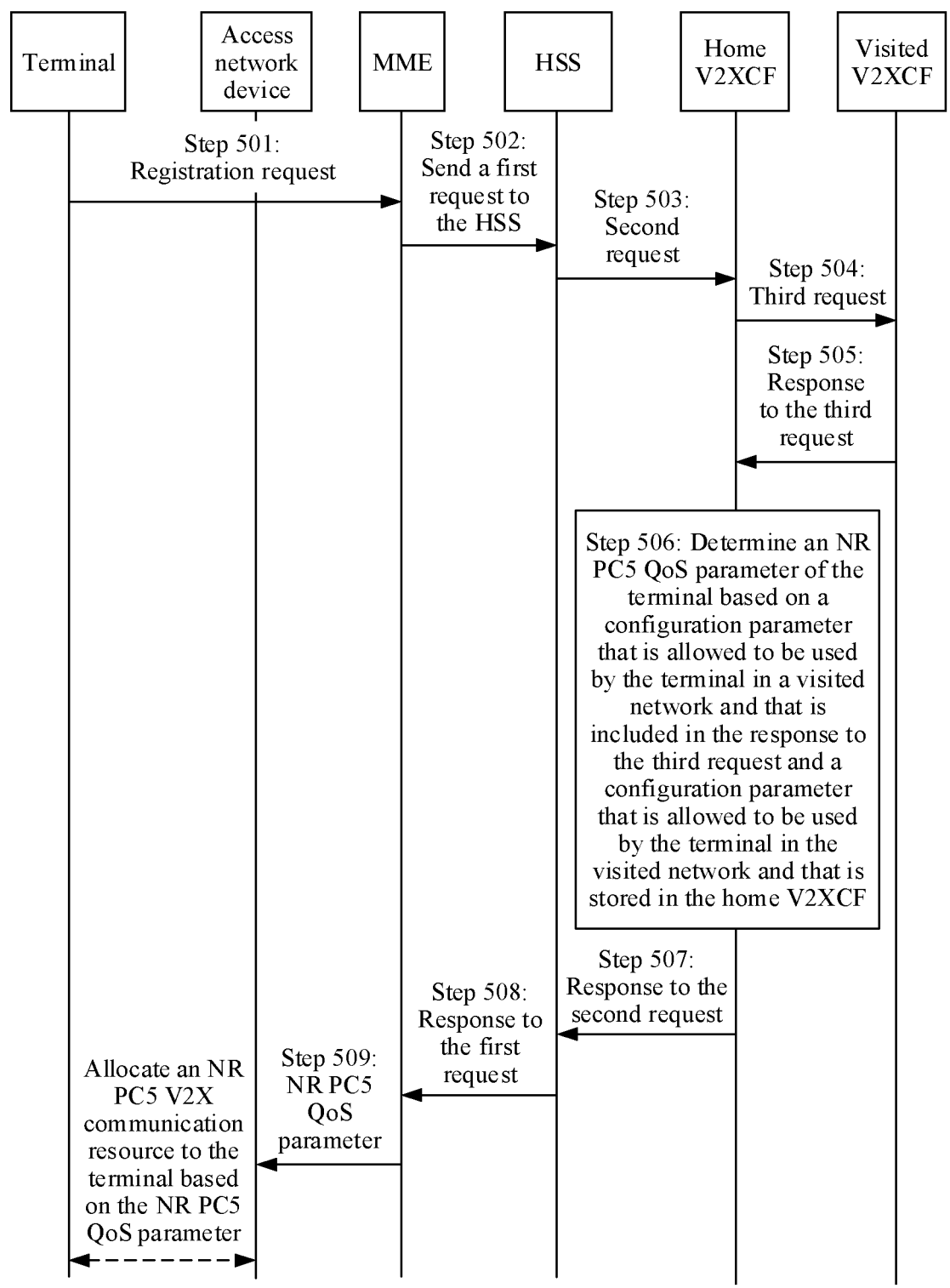
FIG. 5 is a flowchart of another communication method according to an embodiment of this application.

FIG. 5 is another communication method according to an embodiment of this application. As shown in FIG. 5, the method may include the following steps.

Step 501: A terminal sends a registration request to an MME.

The terminal is a terminal in a roaming scenario. As shown in FIG. 1, the terminal may be a terminal 1 roaming to a PLMN 2.

The MME is an MME in a visited network of the terminal, and may be referred to as a visited MME (v-MME). As shown in FIG. 1, if the terminal is the terminal 1 roaming to the PLMN 2, the MME may be an MME in the PLMN 2.

For related descriptions of the registration request and a method for sending the registration request by the terminal to the MME, refer to the descriptions in step 404. Details are not described again.

Step 502: The MME receives the registration request, and sends a first request to an HSS based on the registration request.

For related descriptions of the first request and a specific process of step 502, refer to the descriptions in step 405. Details are not described again.

Step 503: The HSS sends a second request to a home V2XCF based on the first request.

The second request may be used to request an NR PC5 QoS parameter. It should be noted that the NR PC5 QoS parameter in the method shown in FIG. 5 may be referred to as an NR PC5 QoS parameter of the terminal in the visited network, and that the second request is used to request the NR PC5 QoS parameter may further be described as the following: The second request is used to request the NR PC5 QoS parameter of the terminal in the visited network.

The second request may include an identifier of the terminal and information about the visited network of the terminal, and may further include other information. This is not limited. The information about the visited network of the terminal may be used to identify the visited network of the terminal. The information about the visited network of the terminal may be information of about a V-PLMN of the terminal.

For example, after receiving the first request sent by the MME, the HSS may compare the information about the MME that sends the first request with information about an MME that the terminal subscribes to when accessing a network, and if the two pieces of information are different, the MME is determined as the MME in the visited network of the terminal. The terminal is located in the visited network, the HSS obtains, from the local storage, information about a network (that is, the visited network of the terminal) in which the MME is located, and then sends the second request including the information about the V-PLMN of the terminal to the home V2XCF. The information about the MME that the terminal subscribes to when accessing the network may be pre-stored in the HSS.

Step 504: The home V2XCF receives the second request, and sends a third request to a visited V2XCF based on the second request.

The visited V2XCF is a V2XCF in the visited network of the terminal. For example, assuming that the terminal 1 roams to the PLMN 2, the visited V2XCF is a V2XCF in the PLMN 2.

The third request is used to request a configuration parameter allowed to be used by the terminal in the visited network, and the third request may include the identifier of the terminal or other information. This is not limited.

For example, that the home V2XCF sends the third request to the visited V2XCF based on the second request may include: The home V2XCF determines the visited network of the terminal based on information about the v-PLMN in the second request, and sends the third request to the V2XCF in the visited network of the terminal.

Step 505: The visited V2XCF receives the third request, and sends a response to the third request to the home V2XCF based on the third request.

The response to the third request may include the configuration parameter allowed to be used by the terminal in the visited network.

Step 506: The home V2XCF receives the response to the third request, and determines the NR PC5 QoS parameter of the terminal based on the configuration parameter that is allowed to be used by the terminal in the visited network and that is included in the response to the third request and a configuration parameter that is allowed to be used by the terminal in the visited network and that is stored in the home V2XCF.

Step 507: The home V2XCF sends a response to the second request to the HSS.

The response to the second request may include the NR PC5 QoS parameter.

Further, the HSS may locally store the NR PC5 QoS parameter, for example, may correspondingly store the NR PC5 QoS parameter and the information about the visited network. Subsequently, when the terminal roams to the visited network again, the HS S may directly send the locally stored NR PC5 QoS parameter to the MME, and the MME sends the NR PC5 QoS parameter to an access network device. There is no need to obtain the NR PC5 QoS parameter through signaling interaction between the HSS and the home V2XCF and between the home V2XCF and the visited V2XCF, thereby reducing signaling overheads.

Alternatively, further, the home V2XCF may locally store the NR PC5 QoS parameter, for example, may correspondingly store the NR PC5 QoS parameter and the information about the visited network. Subsequently, when the terminal roams to the visited network again, the home V2XCF may directly send the locally stored NR PC5 QoS parameter to the HSS, the HSS sends the NR PC5 QoS parameter to the MME, and the MME sends the NR PC5 QoS parameter to the access network device. There is no need to obtain the NR PC5 QoS parameter through signaling interaction between the home V2XCF and the visited V2XCF, thereby reducing the signaling overheads.

Step 508: The HSS receives the response to the second request, and sends a response to the first request to the MME based on the response to the second request.

The response to the second request may include subscription data of the terminal, and the subscription data of the terminal may include the NR PC5 QoS parameter and other subscription information. This is not limited.

For example, that the HSS sends the response to the first request to the MME based on the response to the second request may include: The HSS obtains the NR PC5 QoS parameter from the response to the second request, and sends, to the MME, the obtained NR PC5 QoS parameter and the other subscription information of the terminal that are jointly used as the subscription data of the terminal.

Step 509: The MME receives the response to the first request, and sends the NR PC5 QoS parameter to the access network device based on the response to the first request.

For example, the MME may obtain the subscription data of the terminal from the response to the first request, obtain the NR PC5 QoS parameter from the subscription data of the terminal, and send the NR PC5 QoS parameter to the access network device.

For example, the MME may send an initial context setup request including the NR PC5 QoS parameter to the access network device.

Further, optionally, after receiving the NR PC5 QoS parameter, the MME stores the received NR PC5 QoS parameter in the MME, for example, stores the received NR PC5 QoS parameter in a context of the terminal. Subsequently, when the terminal moves to the visited network again and sends a registration request to the MME, the MME may send, to the access network device, the NR PC5 QoS parameter stored in the MME. The MME does not need to interact with the HSS to obtain the NR PC5 QoS parameter and send the NR PC5 QoS parameter to the access network device, thereby reducing the signaling overheads.

Further, optionally, the access network device receives the NR PC5 QoS parameter sent by the MME, and stores the received NR PC5 QoS parameter in the access network device. Subsequently, when the terminal performs NR PC5 V2X communication, the access network device may allocate an NR PC5 V2X communication resource to the terminal based on the NR PC5 QoS parameter, so that the terminal performs the NR PC5 V2X communication based on the NR PC5 V2X communication resource allocated by the access network device.

Further, optionally, in the method shown in FIG. 5, after the terminal successfully registers with the network, if the NR PC5 QoS parameter in the home V2XCF and/or the configuration parameter allowed to be used by the terminal in the visited network are/is updated, and as a result, the NR PC5 QoS parameter finally determined by the home V2XCF is updated, the home V2XCF may actively send an updated NR PC5 QoS parameter to the HSS, the HSS sends the updated NR PC5 QoS parameter to the MME, and the MME sends the updated NR PC5 QoS parameter to the access network device, so that the access network device adjusts, based on the updated NR PC5 QoS parameter, the NR PC5 V2X communication resource allocated by the access network device to the terminal.

According to the method shown in FIG. 5, when the terminal is in a roaming scenario, the home V2XCF may be requested to determine the NR PC5 QoS parameter of the terminal based on the configuration parameter allowed to be used by the terminal in the visited network and a configuration parameter allowed to be used by the terminal in a home network, and send the determined NR PC5 QoS parameter to the HSS. The HSS sends the subscription data including the NR PC5 QoS parameter to the MME by using an existing registration procedure, and then the MME sends the subscription data to the access network device. In this way, a problem of how to send the NR PC5 QoS parameter to the access network device is resolved. In addition, the NR PC5 QoS parameter is sent to the access network device by using an existing registration procedure, thereby reducing the signaling overheads and ensuring system compatibility.

In an embodiment, when the terminal is in the roaming scenario, the terminal may directly request the NR PC5 QoS parameter of the terminal in the visited network from the home V2XCF through a PDN connection established by the terminal in the visited network, the home V2XCF sends the NR PC5 QoS parameter of the terminal in the visited network to the MME through the HSS, and then the MME sends the NR PC5 QoS parameter to the access network device. For the process, refer to the descriptions in FIG. 6A and FIG. 6B. It should be noted that the MME in FIG. 6A and FIG. 6B may be referred to as a visited MME (V-MME), and the access network device may be referred to as a visited access network device (V-access network device). The NR PC5 QoS parameter in the method shown in FIG. 6A and FIG. 6B may be the NR PC5 QoS parameter in the visited network of the terminal.

Figure 6A:
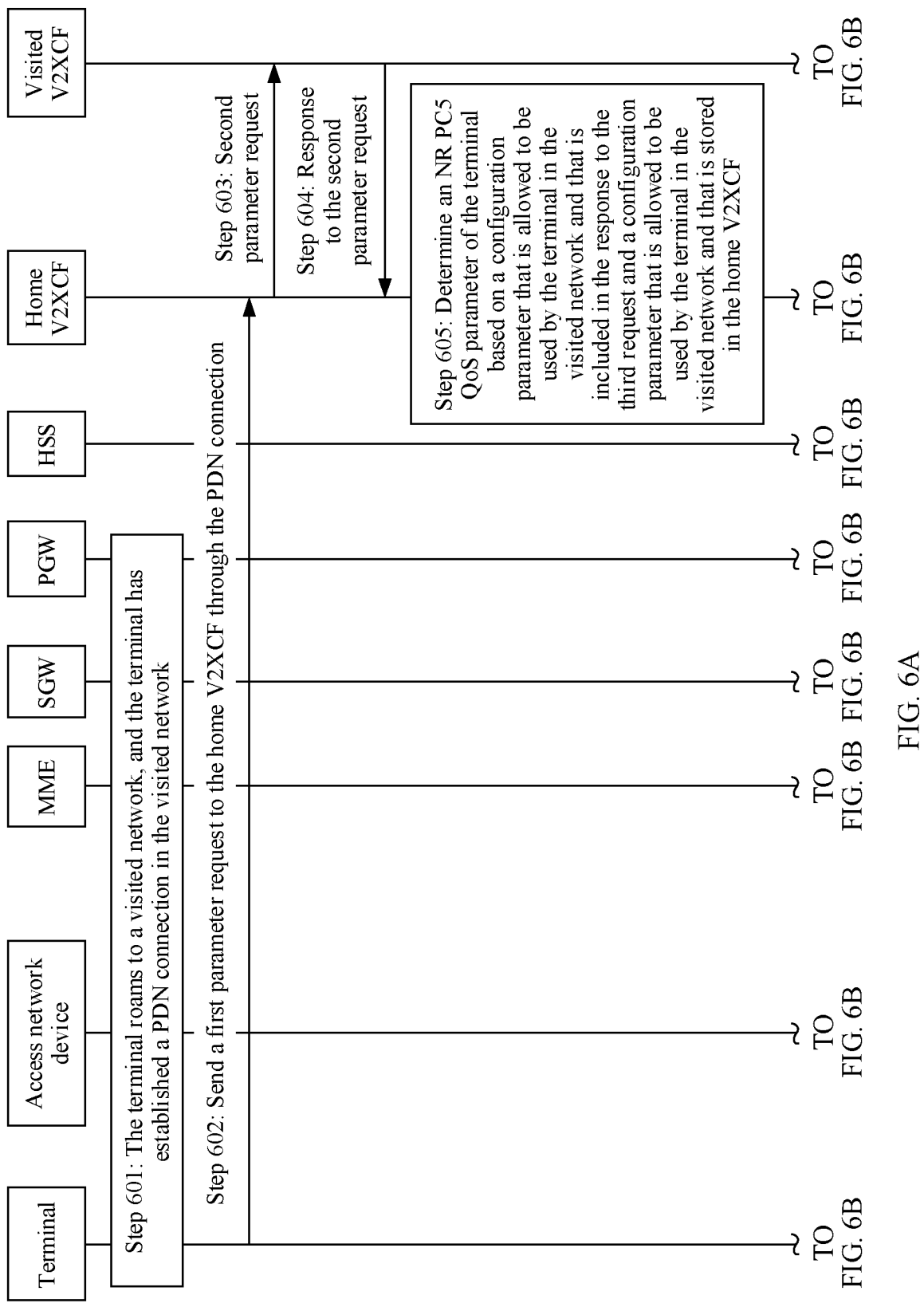

FIG. 6A and FIG. 6B are another communication method according to an embodiment of this application. As shown in FIG. 6A and FIG. 6B, the method may include the following steps.

Step 601: A terminal roams to a visited network, and the terminal establishes a PDN connection in the visited network.

For a process in which the terminal establishes the PDN connection, refer to the conventional technology. Details are not described.

Step 602: The terminal sends a first parameter request to a home V2XCF through the PDN connection.

The first parameter request may be used to request an NR PC5 QoS parameter.

For example, when the terminal finds that authorization information (for example, a configuration parameter allowed to be used by the terminal in the visited network) of the terminal in the visited network is not stored in the terminal, the terminal is triggered to send the first parameter request to the home V2XCF through the PDN connection.

Step 603: The home V2XCF receives the first parameter request through the PDN connection of the terminal in the visited network, and sends a second parameter request to a visited V2XCF based on the first parameter request.

The visited V2XCF is a V2XCF in the visited network of the terminal. For example, assuming that a terminal 1 roams to a PLMN 2, the visited V2XCF is a V2XCF in the PLMN 2.

The second parameter request may be used to request the configuration parameter allowed to be used by the terminal in the visited network, and the second parameter request may include an identifier of the terminal or other information. This is not limited.

For example, that the home V2XCF sends the second parameter request to the visited V2XCF based on the first parameter request may include: The first parameter request sent through the PDN connection of the terminal in the visited network may be used as a trigger condition for the home V2XCF to send the second parameter request. Once receiving the first parameter request through the PDN connection in the visited network, the home V2XCF sends the second parameter request to the visited V2XCF.

Step 604: The visited V2XCF receives the second parameter request, and sends a response to the second parameter request to the home V2XCF based on the second parameter request.

The response to the second parameter request may include the configuration parameter allowed to be used by the terminal in the visited network.

For example, that the visited V2XCF sends the response to the second parameter request to the home V2XCF based on the second parameter request may include: The visited V2XCF obtains, based on the identifier that is of the terminal and that is included in the second parameter request, a configuration parameter corresponding to the identifier of the terminal from a plurality of configuration parameters stored in the visited V2XCF, and sends, to the home V2XCF, the response that is to the second parameter request and that includes the obtained configuration parameter. Alternatively, the visited V2XCF obtains all configuration parameters that are of the terminal and that are applicable to a home network of the terminal, and sends, to the home V2XCF, the response that is to the second parameter request and that includes the configuration parameters.

Step 605: The home V2XCF receives the response to the second parameter request, and determines the NR PC5 QoS parameter of the terminal based on the configuration parameter that is allowed to be used by the terminal in the visited network and that is included in the response to the second parameter request and a configuration parameter that is allowed to be used by the terminal in the visited network and that is stored in the home V2XCF.

For example, for a process of determining the NR PC5 QoS parameter in step 605, refer to the process of determining the NR PC5 QoS parameter of the terminal in the visited network in step 301. Details are not described again.

Step 606: The home V2XCF sends a response of the first parameter request to the terminal.

The response to the first parameter request may include the NR PC5 QoS parameter and another configuration parameter of the terminal.

For example, the home V2XCF may send the response to the first parameter request to the terminal through the PDN connection.

Step 607: The home V2XCF sends the NR PC5 QoS parameter to an HSS.

For example, the home V2XCF may send the NR PC5 QoS parameter to the HSS through an SCEF.

Further, the home V2XCF may locally store the NR PC5 QoS parameter, for example, may correspondingly store the NR PC5 QoS parameter and information about the visited network. Subsequently, when the terminal roams to the visited network again, the home V2XCF may directly send the locally stored NR PC5 QoS parameter to an MME through the HSS, and the MME sends the NR PC5 QoS parameter to an access network device. There is no need to obtain the NR PC5 QoS parameter through signaling interaction between the home V2XCF and the visited V2XCF, thereby reducing signaling overheads.

Step 608: The HSS receives the NR PC5 QoS parameter, and sends the NR PC5 QoS parameter to the MME.

For example, the HSS may send the NR PC5 QoS parameter to the MME by using an insert subscription data (insert subscriber data) request. For example, the HSS may send the insert subscription data request to the MME. The insert subscription data request may include the NR PC5 QoS parameter. Alternatively, the HSS may send the insert subscription data request to the MME. The insert subscription data request includes subscription data of the terminal, and the subscription data of the terminal includes the NR PC5 QoS parameter. It should be noted that, in this application, that the HSS sends the NR PC5 QoS parameter to the MME by using the insert subscription data request is not limited, and the HSS may send the NR PC5 QoS parameter to the MME by using another message, for example, send the NR PC5 QoS parameter to the MME by using a subscription data update request. This is not limited.

Further, the HSS may receive an insert subscription data ack (insert subscriber data ack) from the MME.

Further, the HSS may locally store the NR PC5 QoS parameter, for example, may correspondingly store the NR PC5 QoS parameter and the information about the visited network. Subsequently, when the terminal roams to the visited network again, the HSS may directly send the locally stored NR PC5 QoS parameter to the MME, the MME sends the NR PC5 QoS parameter to the access network device, and there is no need to obtain the NR PC5 QoS parameter through signaling interaction between the HSS and the home V2XCF and between the home V2XCF and the visited V2XCF, thereby reducing signaling overheads.

Step 609: The MME receives the NR PC5 QoS parameter, and sends the NR PC5 QoS parameter to the access network device.

For example, the MME may send an initial context setup request including the NR PC5 QoS parameter to the access network device.

Further, optionally, after receiving the NR PC5 QoS parameter, the MME stores the received NR PC5 QoS parameter in the MME, for example, stores the received NR PC5 QoS parameter in a context of the terminal. Subsequently, when the terminal moves to the visited network again and sends a registration request to the MME, the MME may send, to the access network device, the NR PC5 QoS parameter stored in the MME. The MME does not need to interact with the HSS to obtain the NR PC5 QoS parameter and send the NR PC5 QoS parameter to the access network device, thereby reducing the signaling overheads.

Further, optionally, the access network device receives the NR PC5 QoS parameter sent by the MME, and stores the received NR PC5 QoS parameter in the access network device. Subsequently, when the terminal performs NR PC5 V2X communication, the access network device may allocate an NR PC5 V2X communication resource to the terminal based on the NR PC5 QoS parameter, so that the terminal performs the NR PC5 V2X communication based on the NR PC5 V2X communication resource allocated by the access network device.

Further, optionally, in the method shown in FIG. 6A and FIG. 6B, after the terminal successfully registers with the network, if the NR PC5 QoS parameter in the home V2XCF and/or the configuration parameter allowed to be used by the terminal in the visited network are/is updated, and as a result, the NR PC5 QoS finally determined by the home V2XCF is updated, the home V2XCF may actively send an updated NR PC5 QoS parameter to the HSS, the HSS sends the updated NR PC5 QoS parameter to the MME, and the MME sends the updated NR PC5 QoS parameter to the access network device, so that the access network device adjusts, based on the updated NR PC5 QoS parameter, the NR PC5 V2X communication resource allocated by the access network device to the terminal.

According to the method shown in FIG. 6A and FIG. 6B, when the terminal is in a roaming scenario, the terminal requests, through the PDN connection in the visited network, the home V2XCF to determine the NR PC5 QoS parameter of the terminal based on the configuration parameter allowed to be used by the terminal in the visited network and a configuration parameter allowed to be used by the terminal in a home network, and send the determined NR PC5 QoS parameter to the HSS. The HSS sends the subscription data including the NR PC5 QoS parameter to the MME by using an existing registration procedure, and the MME sends the subscription data to the access network device. In this way, a problem of how to send the NR PC5 QoS parameter to the access network device is resolved. In addition, the NR PC5 QoS parameter is sent to the access network device by using an existing registration procedure, thereby reducing the signaling overheads and ensuring system compatibility.

The methods shown in FIG. 4 to FIG. 6A and FIG. 6B are described merely by using an example in which the HSS sends the NR PC5 QoS parameter to the MME, and the MME sends the NR PC5 QoS parameter to the access network device. In an embodiment, in a PDN connection setup process, a PCRF may further send the NR PC5 QoS parameter to the MME, and the MME sends the NR PC5 QoS parameter to the access network device. For the implementation process, refer to FIG. 7A and FIG. 7B or FIG. 8A and FIG. 8B. It should be noted that the MME in FIG. 7A and FIG. 7B may be referred to as a home MME (H-MME), the access network device may be referred to as a home access network device (H-access network device), the SGW may be referred to as a home SGW (H-SGW), the PGW may be referred to as a home (H-PGW), and the PCRF may be referred to as a home PCRF (H-PCRF). The NR PC5 QoS parameter in the method shown in FIG. 7A and FIG. 7B may be the NR PC5 QoS parameter in the home network of the terminal.

Figure 7A:
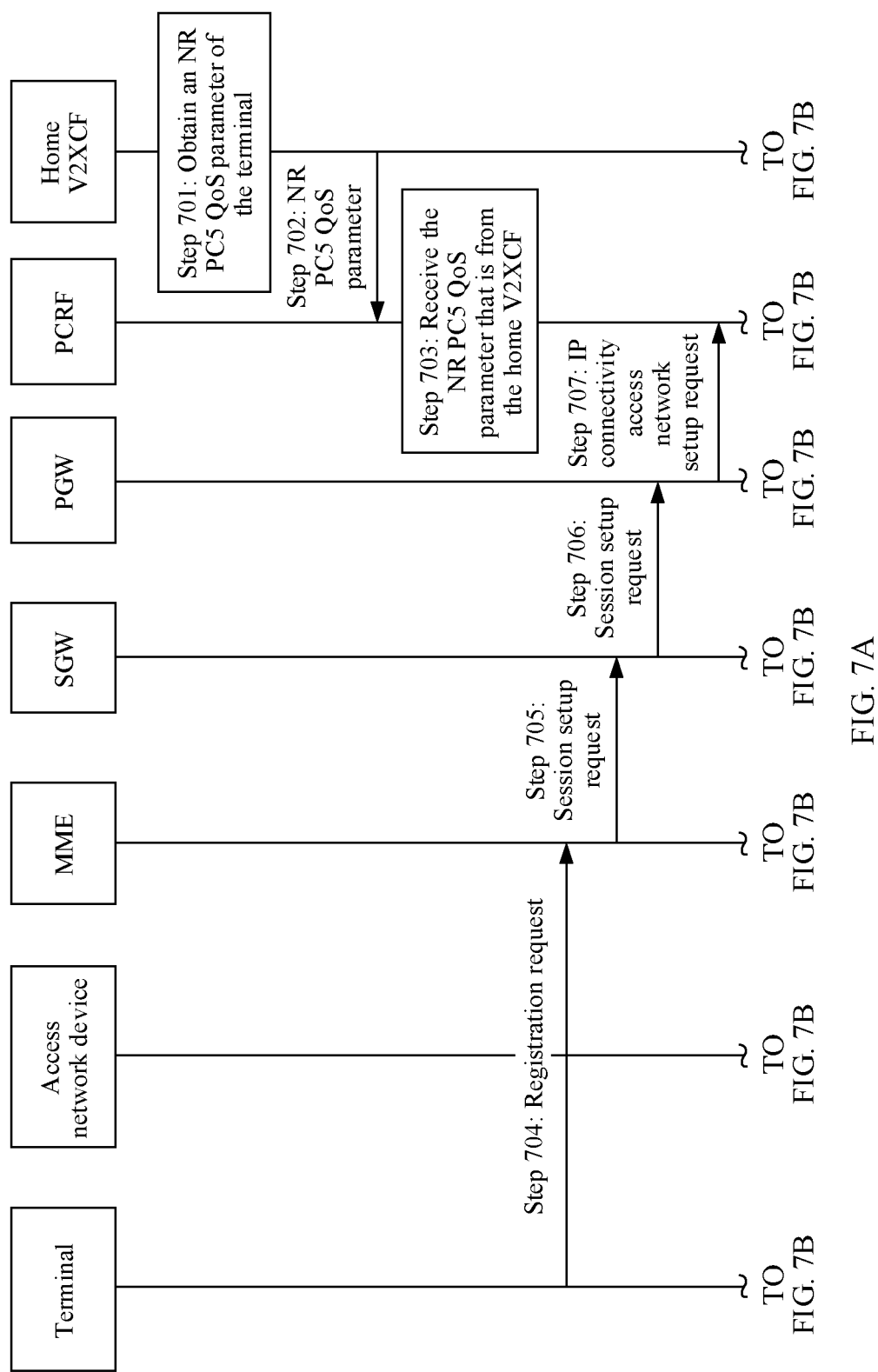
FIG. 7A and FIG. 7B are a flowchart of still another communication method according to an embodiment of this application.
Figure 7B:
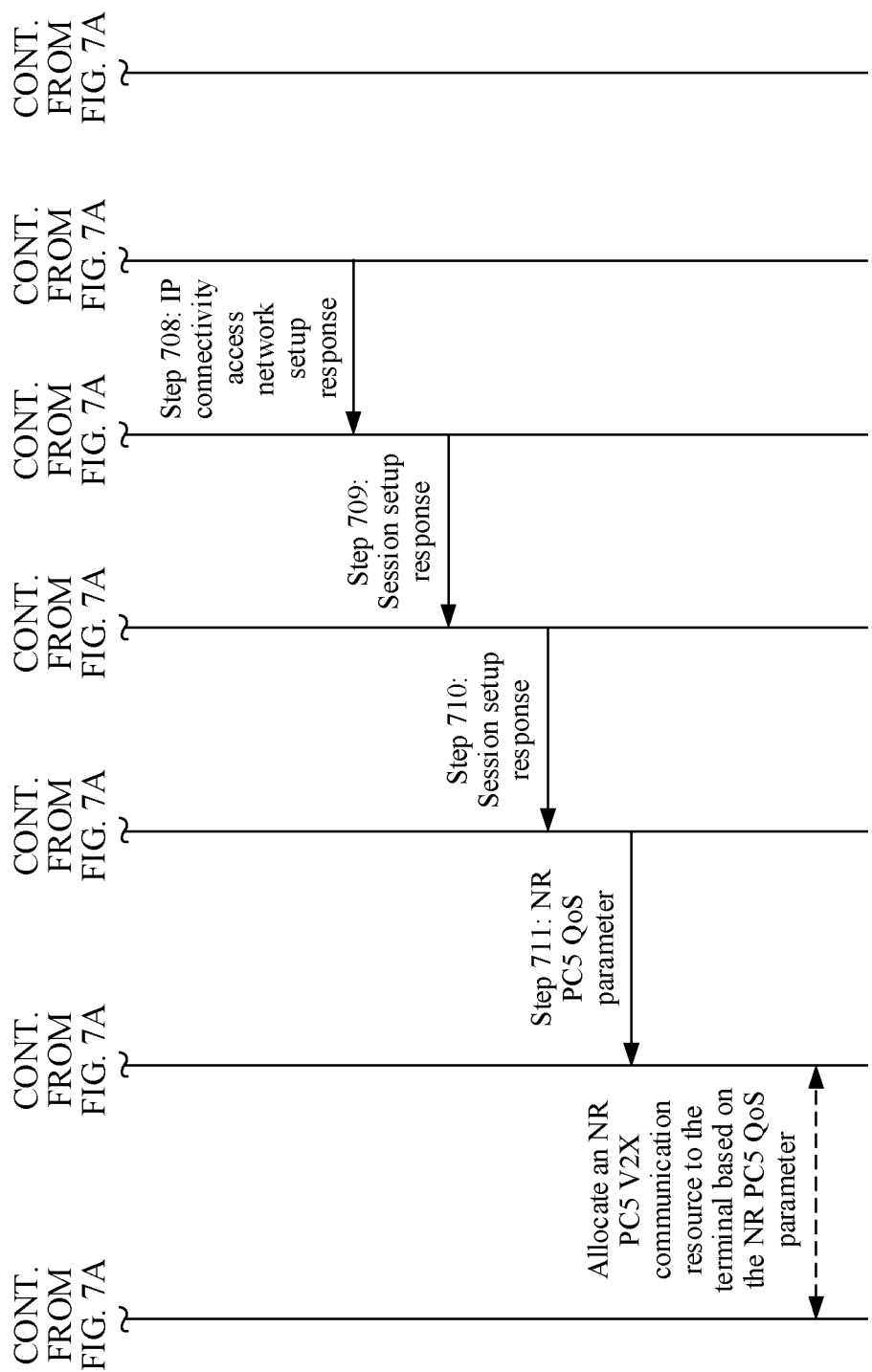

With reference to FIG. 7A and FIG. 7B, the following describes the method shown in FIG. 3 by using an example in which the terminal is in a non-roaming scenario and a first network element is the PCRF. FIG. 7A and FIG. 7B are a communication method according to an embodiment of this application. As shown in FIG. 7A and FIG. 7B, the method may include the following steps.

Step 701: A home V2XCF obtains an NR PC5 QoS parameter of a terminal.

For step 701, refer to step 401. Details are not described again.

Step 702: The home V2XCF sends the NR PC5 QoS parameter to a PCRF.

For example, the home V2XCF may directly send the NR PC5 QoS parameter to the PCRF, or the home V2XCF sends the NR PC5 QoS parameter to the PCRF through an SCEF. This is not limited.

Step 703: The PCRF receives the NR PC5 QoS parameter from the home V2XCF.

Further, optionally, the PCRF stores the received NR PC5 QoS parameter in a PCC rule of the terminal.

Step 704: The terminal sends a registration request to an MME.

For step 704, refer to step 404. Details are not described again.

Step 705: The MME receives the registration request, and sends a session setup request to an SGW based on the registration request.

The session setup request is used to request to establish a PDN connection for the terminal.

Step 706: The SGW receives the session setup request, and sends the session setup request to a PGW.

Step 707: The PGW receives the session setup request, and sends an IP connectivity access network setup request to the PCRF.

The IP connectivity access network setup request is used to request the PCC rule of the PDN connection of the terminal.

Step 708: The PCRF receives the IP connectivity access network setup request, and sends an IP connectivity access network setup response to the PGW.

The IP connectivity access network setup response includes the PCC rule of the terminal, and the PCC rule of the terminal includes the NR PC5 QoS parameter. Alternatively, the IP connectivity access network setup response includes the PCC rule of the terminal and the NR PC5 QoS parameter.

Step 709: The PGW receives the IP connectivity access network setup response, and sends a session setup response to the SGW.

The session setup response includes a bearer context of the PDN connection of the terminal, and the bearer context includes the NR PC5 QoS parameter. Alternatively, the session setup response includes a bearer context of the PDN connection of the terminal and the NR PC5 QoS parameter.

Step 710: The SGW receives the session setup response, and sends the session setup response to the MME.

Step 711: The MME receives the session setup response, and sends the NR PC5 QoS parameter to an access network device.

For example, the MME receives the session setup response, obtains the NR PC5 QoS parameter from the bearer context of the PDN connection of the terminal, and sends the NR PC5 QoS parameter to the access network device. Alternatively, the MME directly obtains the NR PC5 QoS parameter of the terminal from the session setup response, and sends the NR PC5 QoS parameter to the access network device.

For example, the MME may send an initial context setup request including the NR PC5 QoS parameter to the access network device.

Further, optionally, after receiving the NR PC5 QoS parameter, the MME stores the received NR PC5 QoS parameter in the MME, for example, stores the received NR PC5 QoS parameter in a context of the terminal. Subsequently, when the MME receives the registration request of the terminal again, the MME may send, to the access network device, the NR PC5 QoS parameter stored in the MME. The MME does not need to interact with the PCRF to obtain the NR PC5 QoS parameter and send the NR PC5 QoS parameter to the access network device, thereby reducing signaling overheads.

Further, optionally, the access network device receives the NR PC5 QoS parameter sent by the MME, and stores the received NR PC5 QoS parameter in the access network device. Subsequently, when the terminal performs NR PC5 V2X communication, the access network device may allocate an NR PC5 V2X communication resource to the terminal based on the NR PC5 QoS parameter, so that the terminal performs the NR PC5 V2X communication based on the NR PC5 V2X communication resource allocated by the access network device.

Further, optionally, in the method shown in FIG. 7A and FIG. 7B, after the terminal successfully registers with a network, when the NR PC5 QoS parameter in the home V2XCF is updated, the home V2XCF may send an updated NR PC5 QoS parameter to the PCRF, the PCRF sends the updated NR PC5 QoS parameter to the MME, and the MME sends the updated NR PC5 QoS parameter to the access network device, so that the access network device adjusts, based on the updated NR PC5 QoS parameter, the NR PC5 V2X communication resource allocated by the access network device to the terminal. The PCRF may send the updated NR PC5 QoS parameter to the MME by using a session modification procedure.

According to the method shown in FIG. 7A and FIG. 7B, when the terminal is in a non-roaming scenario, the home V2XCF sends the NR PC5 QoS parameter to the PCRF, the PCRF sends the NR PC5 QoS parameter to the MME by using a PDN connection setup procedure, and then the MME sends the NR PC5 QoS parameter to the access network device. In this way, a problem of how to send the NR PC5 QoS parameter to the access network device is resolved. In addition, the NR PC5 QoS parameter is sent to the access network device by using the existing PDN connection setup procedure, thereby reducing the signaling overheads and ensuring system compatibility.

In an embodiment, when the terminal is in a roaming scenario, the home V2XCF may send, by using an existing PDN connection modification procedure, the NR PC5 QoS parameter of the terminal in a visited network to the MME through the PCRF, and then the MME sends the NR PC5 QoS parameter to the access network device. For the process, refer to the descriptions in FIG. 8A and FIG. 8B. It should be noted that the MME in FIG. 8A and FIG. 8B may be referred to as a visited MME (V-MME), the access network device may be referred to as a visited access network device (V-access network device), the SGW may be referred to as a visited SGW (V-SGW), the PGW may be referred to as a visited (V-PGW), and the PCRF may be referred to as a visited PCRF (V-PCRF). The NR PC5 QoS parameter in the method shown in FIG. 8A and FIG. 8B may be the NR PC5 QoS parameter in the visited network of the terminal.

Figure 8A:
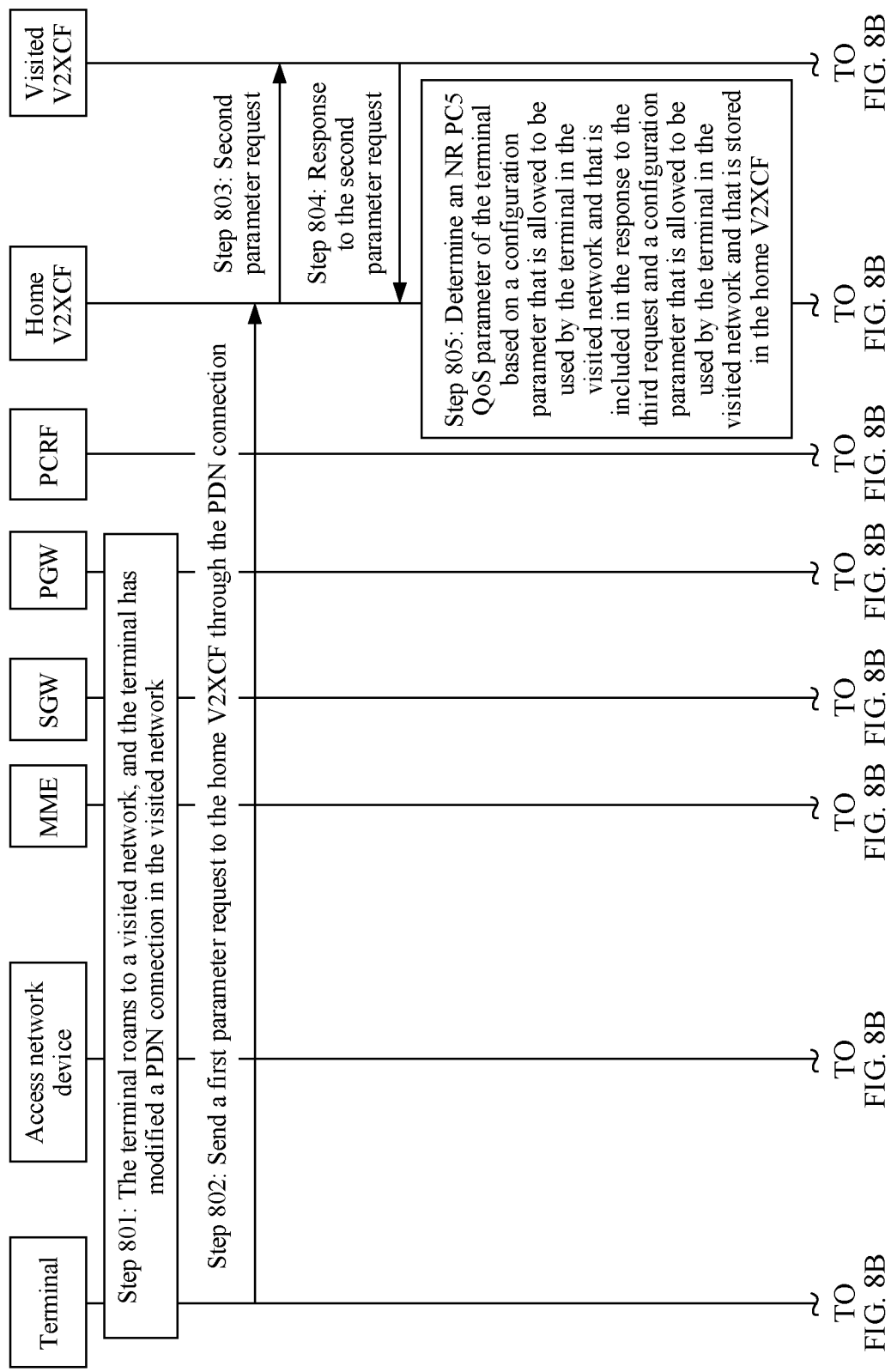
FIG. 8A and FIG. 8B are a flowchart of still another communication method according to an embodiment of this application.
Figure 8B:
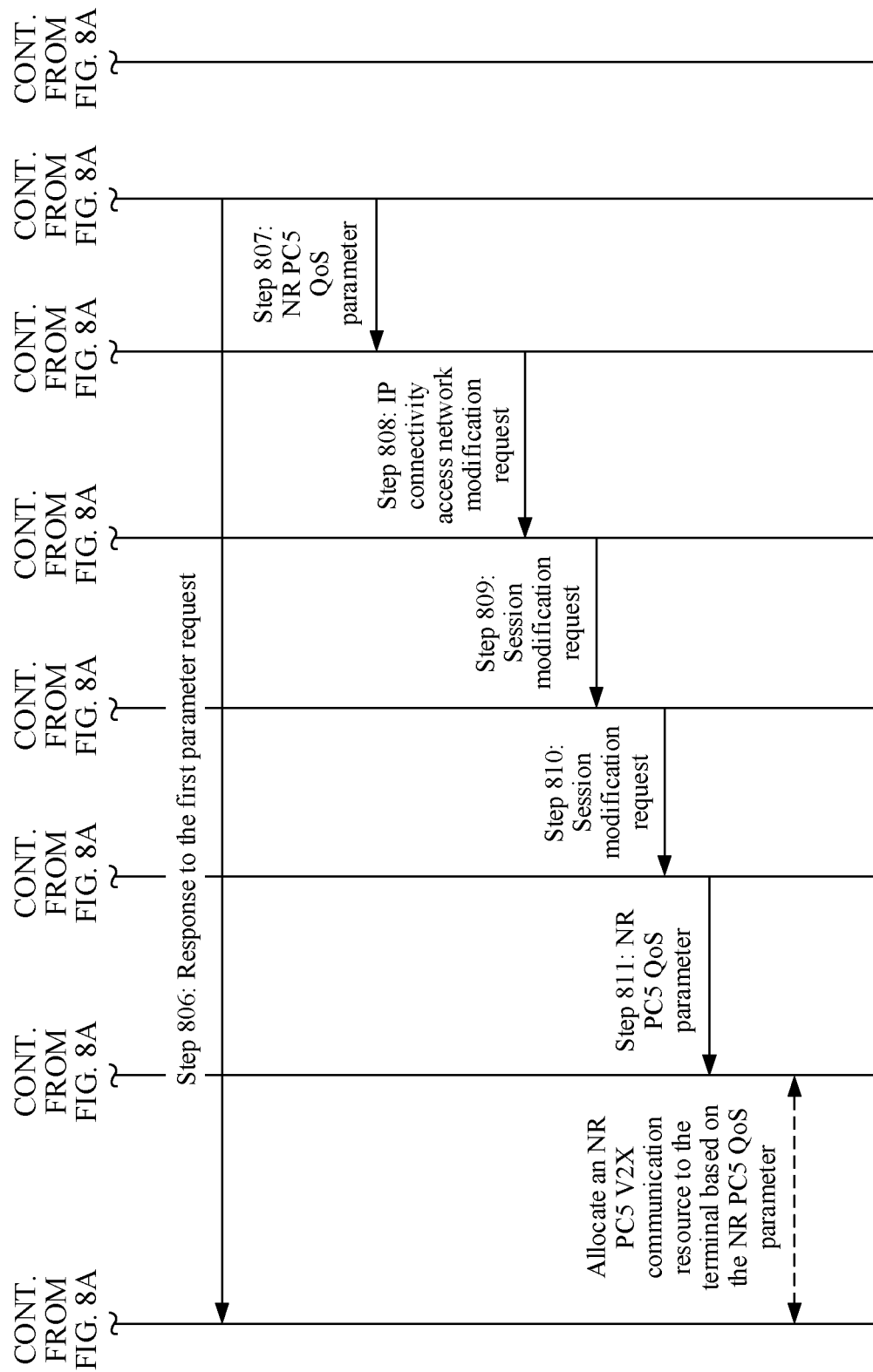

FIG. 8A and FIG. 8B are another communication method according to an embodiment of this application. As shown in FIG. 8A and FIG. 8B, the method may include the following steps.

Step 801: A terminal roams to a visited network, and the terminal establishes a PDN connection in the visited network.

For step 801, refer to step 601. Details are not described again.

Step 802: The terminal sends a first parameter request to a home V2XCF through the PDN connection.

For step 802, refer to step 602. Details are not described again.

Step 803: The home V2XCF receives the first parameter request through the PDN connection of the terminal in the visited network, and sends a second parameter request to a visited V2XCF based on the first parameter request.

For step 803, refer to step 603. Details are not described again.

Step 804: The visited V2XCF receives the second parameter request, and sends a response to the second parameter request to the home V2XCF based on the second parameter request.

For step 804, refer to step 604. Details are not described again.

Step 805: The home V2XCF receives the response to the second parameter request, and determines the NR PC5 QoS parameter of the terminal based on a configuration parameter that is allowed to be used by the terminal in the visited network and that is included in the response to the second parameter request and a configuration parameter that is allowed to be used by the terminal in the visited network and that is stored in the home V2XCF.

For step 805, refer to step 605. Details are not described again.

Step 806: The home V2XCF sends a response of the first parameter request to the terminal.

For step 806, refer to step 606. Details are not described again.

Step 807: The home V2XCF sends the NR PC5 QoS parameter to a PCRF.

For example, the home V2XCF may send the NR PC5 QoS parameter to the PCRF through an SCEF.

Further, the home V2XCF may locally store the NR PC5 QoS parameter, for example, may correspondingly store the NR PC5 QoS parameter and information about the visited network. Subsequently, when the terminal roams to the visited network again, the home V2XCF may directly send the locally stored NR PC5 QoS parameter to an MME through the HSS, and the MME sends the NR PC5 QoS parameter to an access network device. There is no need to obtain the NR PC5 QoS parameter through signaling interaction between the home V2XCF and the visited V2XCF, thereby reducing signaling overheads.

Step 808: The PCRF receives the NR PC5 QoS parameter, and sends an IP connectivity access network modification request to a PGW.

The IP connectivity access network modification request may include a PCC rule of the terminal, and the PCC rule of the terminal includes the NR PC5 QoS parameter. Alternatively, the IP connectivity access network modification request may include the NR PC5 QoS parameter of the terminal.

Further, the PCRF may locally store the NR PC5 QoS parameter, for example, may correspondingly store the NR PC5 QoS parameter and the information about the visited network. Subsequently, when the terminal roams to the visited network again, the PCRF may directly send the locally stored NR PC5 QoS parameter to the MME, and the MME sends the NR PC5 QoS parameter to the access network device. There is no need to obtain the NR PC5 QoS parameter through signaling interaction between the home V2XCF and the visited V2XCF, thereby reducing signaling overheads.

Step 809: The PGW receives the IP connectivity access network modification request, and sends a session modification request to an SGW.

The session modification request may include a bearer context of the PDN connection of the terminal, and the bearer context includes the NR PC5 QoS parameter. Alternatively, the session modification request directly includes the NR PC5 QoS parameter of the terminal.

Step 810: The SGW receives the session modification request, and sends the session modification request to the MME.

Step 811: The MME receives the session modification request, and sends the NR PC5 QoS parameter to the access network device.

For example, the MME receives the session modification request, obtains the NR PC5 QoS parameter from the bearer context of the PDN connection of the terminal, and sends the NR PC5 QoS parameter to the access network device. Alternatively, the MME directly obtains the NR PC5 QoS parameter of the terminal from the session modification request, and sends the NR PC5 QoS parameter to the access network device.

For example, the MME may send an initial context setup request including the NR PC5 QoS parameter to the access network device.

Further, optionally, after receiving the NR PC5 QoS parameter, the MME stores the received NR PC5 QoS parameter in the MME, for example, stores the received NR PC5 QoS parameter in a context of the terminal. Subsequently, when the MME receives a registration request of the terminal again, the MME may send, to the access network device, the NR PC5 QoS parameter stored in the MME. The MME does not need to interact with the PCRF to obtain the NR PC5 QoS parameter and send the NR PC5 QoS parameter to the access network device, thereby reducing signaling overheads.

Further, optionally, the access network device receives the NR PC5 QoS parameter sent by the MME, and stores the received NR PC5 QoS parameter in the access network device. Subsequently, when the terminal performs NR PC5 V2X communication, the access network device may allocate an NR PC5 V2X communication resource to the terminal based on the NR PC5 QoS parameter, so that the terminal performs the NR PC5 V2X communication based on the NR PC5 V2X communication resource allocated by the access network device.

Further, optionally, in the method shown in FIG. 8A and FIG. 8B, after the terminal successfully registers with a network, when the NR PC5 QoS parameter in the home V2XCF is updated, the home V2XCF may send an updated NR PC5 QoS parameter to the PCRF, the PCRF sends the updated NR PC5 QoS parameter to the MME, and the MME sends the updated NR PC5 QoS parameter to the access network device, so that the access network device adjusts, based on the updated NR PC5 QoS parameter, the NR PC5 V2X communication resource allocated by the access network device to the terminal. The PCRF may send the updated NR PC5 QoS parameter to the MME by using a session modification procedure.

According to the method shown in FIG. 8A and FIG. 8B, when the terminal is in a non-roaming scenario, the home V2XCF sends the NR PC5 QoS parameter to the PCRF, the PCRF sends subscription data including the NR PC5 QoS parameter to the MME by using a PDN connection modification procedure, and then the MME sends the subscription data to the access network device. In this way, a problem of how to send the NR PC5 QoS parameter to the access network device is resolved. In addition, the NR PC5 QoS parameter is sent to the access network device by using the existing PDN connection modification procedure, thereby reducing the signaling overheads and ensuring system compatibility.

The foregoing mainly describes the solutions provided in the embodiments of this application from a perspective of interaction between nodes. It may be understood that, to implement the foregoing functions, each node, for example, a centralized controller, a first functional entity, or a second functional entity, includes a corresponding hardware structure and/or software module for performing each function. A person of ordinary skill in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, the centralized controller, the first functional entity, or the second functional entity may be divided into function modules based on the foregoing method examples. For example, function modules may be divided by using corresponding functions, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 9:
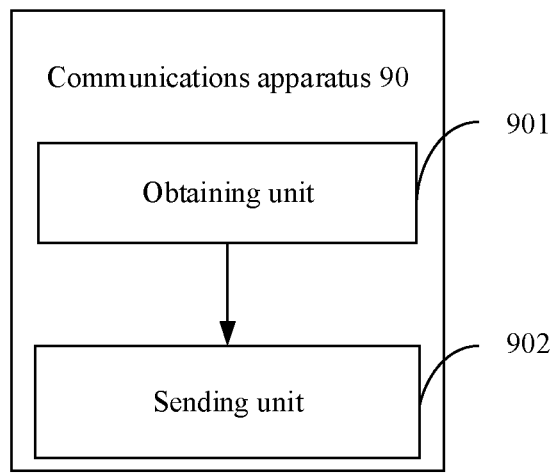
FIG. 9 is a diagram of a communications apparatus according to an embodiment of this application.

FIG. 9 is a diagram of a communications apparatus 90 according to an embodiment of this application. The communications apparatus 90 may be an MME, a chip in an MME, or a system on chip. As shown in FIG. 9, the communications apparatus 90 may include an obtaining unit 901 and a sending unit 902.

The obtaining unit 901 is configured to obtain an NR PC5 QoS parameter that is of a terminal and that is used for NR PC5 V2X communication of the terminal.

The sending unit 902 is configured to send the NR PC5 QoS parameter to an access network device.

In the embodiments, all related content of the steps related to the MME in the method embodiments shown in FIG. 3 to FIG. 8A and FIG. 8B may be referenced to function descriptions of corresponding functional modules. Details are not described herein again. The communications apparatus 90 in the embodiments is configured to execute the function of the MME in the communication method shown in FIG. 3 to FIG. 8A and FIG. 8B. Therefore, an effect the same as that of the foregoing communication method can be achieved.

It should be noted that in another embodiment, the communications apparatus 90 shown in FIG. 9 may include a processing module and a communications module. A function of the obtaining unit 901 may be integrated into the processing module, and a function of the sending unit 902 may be integrated into the communications module. The processing module is configured to control and manage an action of the communications apparatus 90. For example, the processing module is configured to support the communications apparatus 90 in performing another process of the technology described in this specification. The communications module is configured to support the communications apparatus 90 in communicating with another network entity. Further, the communications apparatus 90 shown in FIG. 9 may further include a storage module, configured to store program code and data of the communications apparatus 90.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module may be a transceiver circuit, a communications interface, or the like. The storage module may be a memory. When the processing module is the processor, the communications module is the communications interface, and the storage module is the memory, the communications apparatus 90 shown in FIG. 9 may be the communications apparatus shown in FIG. 2.

Figure 10:
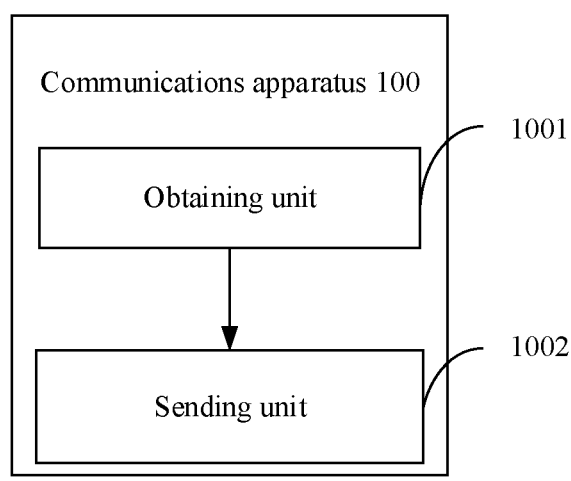
FIG. 10 is a diagram of a communications apparatus according to an embodiment of this application.

FIG. 10 is a diagram of a communications apparatus 100 according to an embodiment of this application. The communications apparatus 100 may be an HSS, a chip in an HSS, or a system on chip. As shown in FIG. 10, the communications apparatus 100 may include an obtaining unit 1001 and a sending unit 1002.

The obtaining unit 1001 is configured to obtain an NR PC5 QoS parameter that is from a home V2XCF and that is used for NR PC5 V2X communication of a terminal.

The sending unit 1002 is configured to send the NR PC5 QoS parameter to an MME.

In the embodiments, all related content of the steps related to the HSS in the method embodiments shown in FIG. 3 to FIG. 6A and FIG. 6B may be referenced to function descriptions of corresponding functional modules. Details are not described herein again. The communications apparatus 100 in the embodiment is configured to execute the function of the HSS in the communication method shown in FIG. 3 to FIG. 6A and FIG. 6B. Therefore, an effect the same as that of the foregoing communication method can be achieved.

It should be noted that in another embodiment, the communications apparatus 100 shown in FIG. 10 may include a processing module and a communications module. A function of the obtaining unit 1001 may be integrated into the processing module, and a function of the sending unit 1002 may be integrated into the communications module. The processing module is configured to control and manage an action of the communications apparatus 100. For example, the processing module is configured to support the communications apparatus 100 in performing another process of the technology described in this specification. The communications module is configured to support the communications apparatus 100 in communicating with another network entity. Further, the communications apparatus 100 shown in FIG. 10 may further include a storage module, configured to store program code and data of the communications apparatus 100.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module may be a transceiver circuit, a communications interface, or the like. The storage module may be a memory. When the processing module is the processor, the communications module is the communications interface, and the storage module is the memory, the communications apparatus 100 shown in FIG. 10 may be the communications apparatus shown in FIG. 2.

Figure 11:
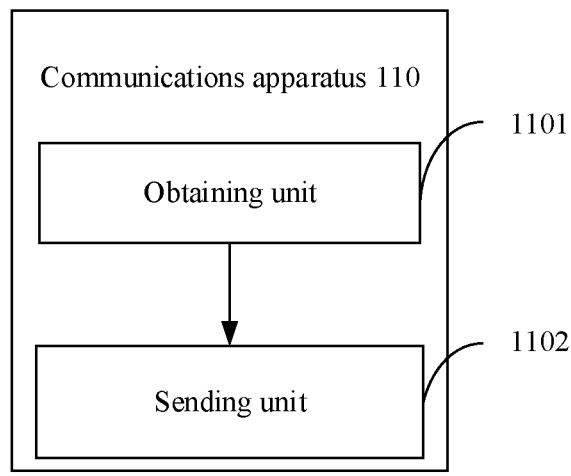
FIG. 11 is a diagram of a communications apparatus according to an embodiment of this application.

FIG. 11 is a diagram of a communications apparatus 110 according to an embodiment of this application. The communications apparatus 110 may be a PCRF, a chip in a PCRF, or a system on chip. As shown in FIG. 11, the communications apparatus 110 may include an obtaining unit 1101 and a sending unit 1102.

The obtaining unit 1101 is configured to obtain an NR PC5 QoS parameter that is from a home V2XCF and that is used for NR PC5 V2X communication of a terminal.

The sending unit 1102 is configured to send the NR PC5 QoS parameter to an MME.

In the embodiments, all related content of the steps related to the PCRF in the method embodiments shown in FIG. 3, FIG. 7A and FIG. 7B, and FIG. 8A and FIG. 8B may be referenced to function descriptions of corresponding functional modules. Details are not described herein again. The communications apparatus 110 in the embodiment is configured to execute the function of the PCRF in the communication method shown in FIG. 3, FIG. 7A and FIG. 7B, and FIG. 8A and FIG. 8B. Therefore, an effect the same as that of the foregoing communication method can be achieved.

It should be noted that in another embodiment, the communications apparatus 110 shown in FIG. 11 may include a processing module and a communications module. A function of the obtaining unit 1101 may be integrated into the processing module, and a function of the sending unit 1102 may be integrated into the communications module. The processing module is configured to control and manage an action of the communications apparatus 110. For example, the processing module is configured to support the communications apparatus 110 in performing another process of the technology described in this specification. The communications module is configured to support the communications apparatus 110 in communicating with another network entity. Further, the communications apparatus 110 shown in FIG. 11 may further include a storage module, configured to store program code and data of the communications apparatus 110.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module may be a transceiver circuit, a communications interface, or the like. The storage module may be a memory. When the processing module is the processor, the communications module is the communications interface, and the storage module is the memory, the communications apparatus 110 shown in FIG. 11 may be the communications apparatus shown in FIG. 2.

Figure 12:
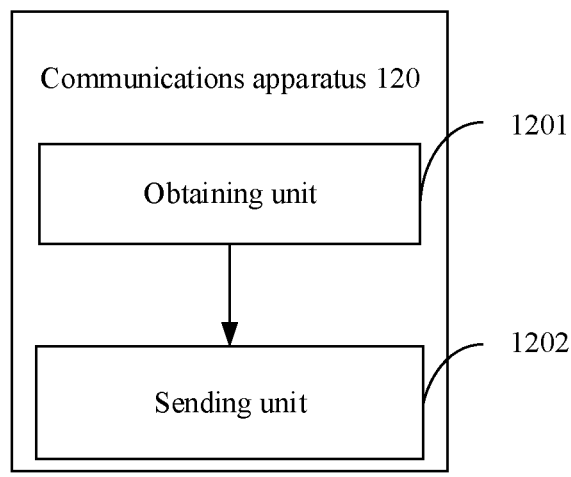
FIG. 12 is a diagram of a communications apparatus according to an embodiment of this application.

FIG. 12 is a diagram of a communications apparatus 120 according to an embodiment of this application. The communications apparatus 120 may be a home V2XCF, a chip in a home V2XCF, or a system on chip. As shown in FIG. 12, the communications apparatus 120 may include an obtaining unit 1201 and a sending unit 1202.

The obtaining unit 1201 is configured to obtain an NR PC5 QoS parameter of a terminal.

The sending unit 1202 is configured to send the NR PC5 QoS parameter to a first network element that is in an EPS.

In the embodiments, all related content of the steps related to the home V2XCF in the method embodiments shown in FIG. 3 to FIG. 8A and FIG. 8B may be referenced to function descriptions of corresponding functional modules. Details are not described herein again. The communications apparatus 120 in the embodiment is configured to execute the function of the home V2XCF in the communication method shown in FIG. 3, FIG. 7A and FIG. 7B, and FIG. 8A and FIG. 8B. Therefore, an effect the same as that of the foregoing communication method can be achieved.

It should be noted that in another embodiment, the communications apparatus 120 shown in FIG. 12 may include a processing module and a communications module. A function of the obtaining unit 1201 may be integrated into the processing module, and a function of the sending unit 1202 may be integrated into the communications module. The processing module is configured to control and manage an action of the communications apparatus 120. For example, the processing module is configured to support the communications apparatus 120 in performing another process of the technology described in this specification. The communications module is configured to support the communications apparatus 120 in communicating with another network entity. Further, the communications apparatus 120 shown in FIG. 12 may further include a storage module, configured to store program code and data of the communications apparatus 120.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module may be a transceiver circuit, a communications interface, or the like. The storage module may be a memory. When the processing module is the processor, the communications module is the communications interface, and the storage module is the memory, the communications apparatus 120 shown in FIG. 12 may be the communications apparatus shown in FIG. 2.

Figure 13:
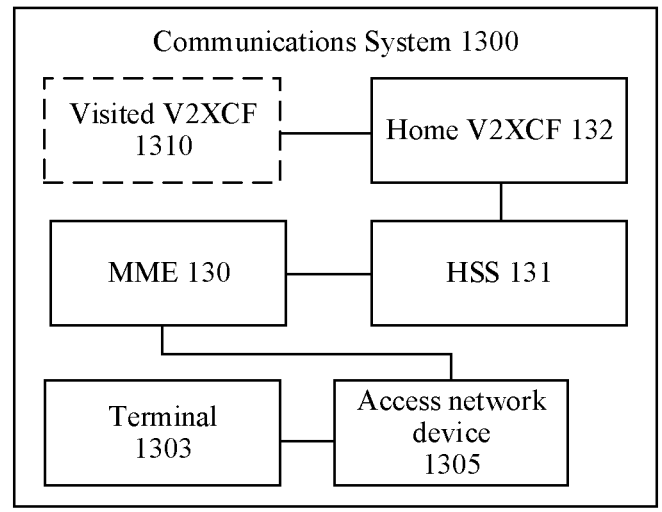
FIG. 13 is a diagram of a communications system according to an embodiment of this application.

FIG. 13 is a diagram of a communications system according to an embodiment of this application. As shown in FIG. 13, the communications system may include a terminal, an access network device, an MME 130, an HSS 131, and a home V2XCF 132.

A function of the MME 130 is the same as a function of the communications apparatus 90. For example, the home V2XCF 132 is configured to: obtain an NR PC5 QoS parameter of the terminal, and send the NR PC5 QoS parameter to the HSS 131.

A function of the HSS 131 is the same as a function of the communications apparatus 100. For example, the HSS 131 is configured to: receive the NR PC5 QoS parameter from the home V2XCF 132, and send the NR PC5 QoS parameter to the MME 130.

A function of the home V2XCF 132 is the same as a function of the communications apparatus 120. For example, the MME 130 is configured to: receive the NR PC5 QoS parameter from the HSS 131, and send the NR PC5 QoS parameter to the access network device.

Further, after receiving the NR PC5 QoS parameter, the access network device schedules an NR PC5 V2X communication resource for the terminal based on the NR PC5 QoS parameter of the terminal, so that the terminal performs NR PC5 V2X communication on the NR PC5 V2X communication resource scheduled by the access network device.

Further, optionally, when the terminal is roaming, the MME 130 is an MME of the terminal in a visited network. As shown in FIG. 13, FIG. 13 further includes a visited V2XCF. That the home V2XCF 132 is configured to obtain an NR PC5 QoS parameter of the terminal includes:

The home V2XCF 132 obtains, from the visited V2XCF, a configuration parameter allowed to be used by the terminal in the visited network, and determines the NR PC5 QoS parameter of the terminal based on a configuration parameter allowed to be used by the terminal in a home network and the configuration parameter allowed to be used by the terminal in the visited network. For example, the home V2XCF may determine an intersection set of the configuration parameters allowed to be used by the terminal in the home network and the configuration parameters allowed to be used by the terminal in the visited network as the NR PC5 QoS parameter of the terminal in the visited network.

Based on the system shown in FIG. 13, the home V2XCF 132 may send the NR PC5 QoS parameter to the HSS 131, the HSS 131 sends the NR PC5 QoS parameter to the MME 130, and then the MME 130 sends the NR PC5 QoS parameter to the access network device. In this way, a problem of how to send the NR PC5 QoS parameter to the access network device is resolved. In addition, the NR PC5 QoS parameter is sent to the access network device by using an existing subscription data sending procedure, thereby reducing signaling overheads and ensuring system compatibility.

Figure 14:
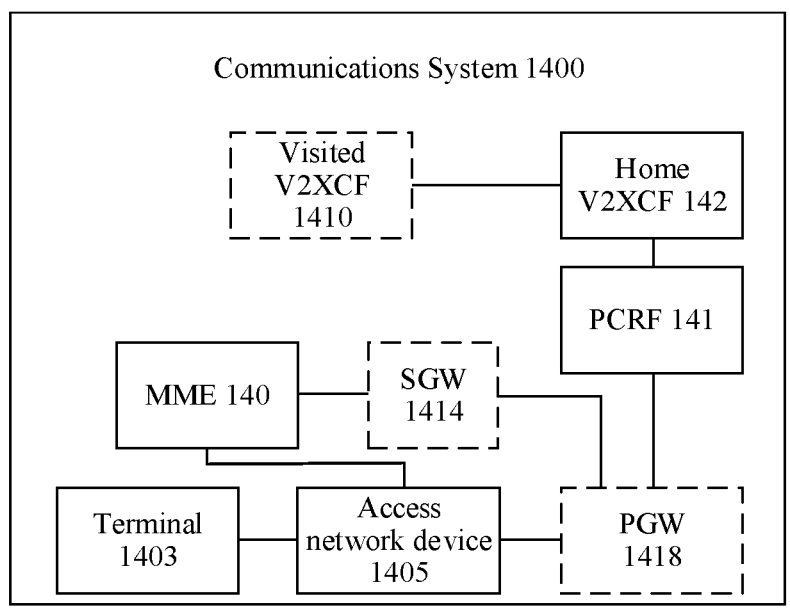
FIG. 14 is a diagram of another communications system according to an embodiment of this application.

FIG. 14 is a diagram of a communications system according to an embodiment of this application. As shown in FIG. 14, the communications system may include a terminal, an access network device, an MME 140, a PCRF 141, and a home V2XCF 142.

A function of the MME 140 is the same as a function of the communications apparatus 90. For example, the home V2XCF 142 is configured to: obtain an NR PC5 QoS parameter of the terminal, and send the NR PC5 QoS parameter to the PCRF 141.

A function of the PCRF 141 is the same as a function of the communications apparatus 100. For example, the PCRF 141 is configured to: receive the NR PC5 QoS parameter from the home V2XCF 142, and send the NR PC5 QoS parameter to the MME 140.

A function of the home V2XCF 142 is the same as a function of the communications apparatus 120. For example, the MME 140 is configured to: receive the NR PC5 QoS parameter from the PCRF 141, and send the NR PC5 QoS parameter to the access network device.

Further, after receiving the NR PC5 QoS parameter, the access network device schedules an NR PC5 V2X communication resource for the terminal based on the NR PC5 QoS parameter of the terminal, so that the terminal performs NR PC5 V2X communication on the NR PC5 V2X communication resource scheduled by the access network device.

Further, optionally, when the terminal is roaming, the MME 140 is an MME of the terminal in a visited network. As shown in FIG. 14, FIG. 14 further includes a visited V2XCF. That the home V2XCF 142 is configured to obtain an NR PC5 QoS parameter of the terminal includes:

The home V2XCF 142 obtains, from the visited V2XCF, a configuration parameter allowed to be used by the terminal in the visited network, and determines the NR PC5 QoS parameter of the terminal based on a configuration parameter allowed to be used by the terminal in a home network and the configuration parameter allowed to be used by the terminal in the visited network. For example, the home V2XCF may determine an intersection set of the configuration parameters allowed to be used by the terminal in the home network and the configuration parameters allowed to be used by the terminal in the visited network as the NR PC5 QoS parameter of the terminal in the visited network.

Further, as shown in FIG. 14, the system may further include a PGW and an SGW. That the PCRF 141 is configured to send the NR PC5 QoS parameter to the MME 140 includes: The PCRF 141 is configured to send the NR PC5 QoS parameter to the MME 140 through the PGW and the SGW. For a detailed process in which the PCRF 141 sends the NR PC5 QoS parameter to the MME 140 through the PGW and the SGW, refer to the steps shown in FIG. 7A and FIG. 7B or FIG. 8A and FIG. 8B.

Based on the system shown in FIG. 14, the home V2XCF 142 may send the NR PC5 QoS parameter to the PCRF 141, the PCRF 141 sends the NR PC5 QoS parameter to the MME 140, and then the MME 140 sends the NR PC5 QoS parameter to the access network device. In this way, a problem of how to send the NR PC5 QoS parameter to the access network device is resolved. In addition, the NR PC5 QoS parameter is sent to the access network device by using a PDN connection setup procedure or a PDN connection modification procedure, thereby reducing signaling overheads and ensuring system compatibility.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, the method comprising:
obtaining, by a mobility management entity (MME), a new radio PC5 quality of service (NR PC5 QoS) parameter of a terminal from a home subscriber server (HSS), the HSS carrying the NR PC5 QoS parameter in the subscription data of the terminal, the NR PC5 QoS parameter being used for new radio PC5 vehicle to everything (NR PC5 V2X) communication of the terminal; and
sending, by the MME, the NR PC5 QoS parameter to an access network device.

2. The method according to claim 1, wherein the obtaining, by the MME, the NR PC5 QoS parameter from the home subscriber server (HSS) comprises:
receiving, by the MME, the subscription data of the terminal from the HSS, wherein the subscription data of the terminal comprises the NR PC5 QoS parameter.

3. The method according to claim 1, wherein the obtaining, by the MME, the NR PC5 QoS parameter from the home subscriber server (HSS) comprises:
receiving, by the MME, a subscription data update message from the HSS, wherein the subscription data update message comprises the NR PC5 QoS parameter.

4. The method according to claim 1, wherein the method further comprises:
storing, by the MME, the NR PC5 QoS parameter.

5. The method according to claim 4, wherein the storing, by the MME, the NR PC5 QoS parameter comprises:
storing, by the MME, the NR PC5 QoS parameter in a context of the terminal.

6. The method according to claim 1, wherein the sending, by the MME, the NR PC5 QoS parameter to the access network device comprises:
sending, by the MME, an initial context setup request to the access network device, the initial context setup request carrying the NR PC5 QoS parameter.

7. The method according to claim 1, wherein the method further comprises:
sending, by the HSS, the NR PC5 QoS parameter to the MME.

8. The method according to claim 1, wherein the method further comprises:

allocating, by the access network device, an NR PC5 V2X communication resource to the terminal based on the NR PC5 QoS parameter.

9. A communications apparatus, the communications apparatus comprising:
a non-transitory memory storing instructions;
at least one processor in communication with the memory storage and configured, upon execution of the instructions to perform the following steps:
obtain a new radio PC5 quality of service (NR PC5 QoS) parameter of a terminal from a home subscriber server (HSS), the HSS carrying the NR PC5 QoS parameter in the subscription data of the terminal, the NR PC5 QoS parameter being used for new radio PC5 vehicle to X (NR PC5 V2X) communication of the terminal; and
send the NR PC5 QoS parameter to an access network device.

10. The communications apparatus according to claim 9, wherein the at least one processor is further configured to execute the instructions to:
receive the subscription data of the terminal from the HSS, wherein the subscription data of the terminal comprises the NR PC5 QoS parameter.

11. The communications apparatus according to claim 9, wherein the at least one processor is further configured to execute the instructions to store the NR PC5 QoS parameter.

12. The communications apparatus according to claim 11, wherein the at least one processor is further configured to execute the instructions to store the NR PC5 QoS parameter in a context of the terminal.

13. The communications apparatus according to claim 9, wherein the at least one processor is further configured to execute the instructions to:
send an initial context setup request to the access network device, the initial context setup request carrying the NR PC5 QoS parameter.

14. A communications system, the communications system comprising:
a home subscriber server (HSS);
an access network device; and
a mobility management entity (MME) in communication with the HSS and the access network device;
the HSS is configured to send a new radio PC5 quality of service (NR PC5 QoS) parameter to the MME, the HSS carrying the NR PC5 QoS parameter in the subscription data of the terminal; and
the MME is configured to:
obtain the NR PC5 QoS parameter from the HSS; and
send the NR PC5 QoS parameter to the access network device.

15. The communications system according to claim 14, wherein the MME is further configured to:
receive the subscription data of the terminal from the HSS, wherein the subscription data of the terminal comprises the NR PC5 QoS parameter.

16. The communications system according to claim 14, wherein the MME is further configured to:
send an initial context setup request to the access network device, the initial context setup request carrying the NR PC5 QoS parameter.

17. The communications system according to claim 14, wherein the MME is further configured to:
store the NR PC5 QoS parameter.

18. The communications system according to claim 17, wherein the MME is further configured to:
store the NR PC5 QoS parameter in a context of the terminal.

19. The communications system according to claim 14, wherein the access network device is configured to:
allocate a NR PC5 V2X communication resource to the terminal based on the NR PC5 QoS parameter.

* * * * *